US009103468B2

(12) United States Patent
Li et al.

(10) Patent No.: US 9,103,468 B2
(45) Date of Patent: Aug. 11, 2015

(54) ENHANCED FLOW BOILING IN MICROCHANNELS BY HIGH FREQUENCY MICROBUBBLE-EXCITED AND -MODULATED OSCILLATIONS

(71) Applicant: University of South Carolina, Columbia, SC (US)

(72) Inventors: Chen Li, Chapin, SC (US); Fanghao Yang, Changsha (CN); Xianming Dai, Wuhan (CN); Yan Tong, Chapin, SC (US)

(73) Assignee: University of South Carolina, Columbia, SC (US)

( * ) Notice: Subject to any disclaimer, the term of this patent is extended or adjusted under 35 U.S.C. 154(b) by 2 days.

(21) Appl. No.: 13/828,701

(22) Filed: Mar. 14, 2013

(65) Prior Publication Data

US 2014/0027005 A1    Jan. 30, 2014

Related U.S. Application Data

(60) Provisional application No. 61/741,952, filed on Jul. 30, 2012, provisional application No. 61/742,009, filed on Aug. 1, 2012.

(51) Int. Cl.
| *F16L 9/00* | (2006.01) |
| *B01J 8/00* | (2006.01) |
| *B01J 19/00* | (2006.01) |
| *B01J 19/18* | (2006.01) |
| *B01L 3/00* | (2006.01) |

(52) U.S. Cl.
CPC ............. *F16L 9/006* (2013.01); *B01L 3/50273* (2013.01); *B01J 8/00* (2013.01); *B01J 19/006* (2013.01); *B01J 19/0013* (2013.01); *B01J 19/1812* (2013.01); *B01L 3/502707* (2013.01); *B01L 2200/0684* (2013.01); *B01L 2300/1827* (2013.01); *B01L 2300/1883* (2013.01); *B01L 2400/0442* (2013.01)

(58) Field of Classification Search
None
See application file for complete search history.

(56) References Cited

U.S. PATENT DOCUMENTS

| 2005/0183957 | A1* | 8/2005 | Desmond et al. ............. 204/600 |
| 2010/0166611 | A1* | 7/2010 | Desmet .......................... 422/70 |
| 2011/0311978 | A1* | 12/2011 | Makarewicz et al. ........ 435/6.12 |
| 2012/0164679 | A1* | 6/2012 | Vrouwe et al. ................. 435/29 |
| 2012/0236299 | A1* | 9/2012 | Chiou et al. .................. 356/301 |
| 2013/0183211 | A1* | 7/2013 | Senftleber ..................... 422/504 |

(Continued)

OTHER PUBLICATIONS

Boure et al., "Review of Two-Phase Flow Instability", Nuclear Engineering and Design 25 (1973) 165-192.

(Continued)

*Primary Examiner* — Jill Warden
*Assistant Examiner* — Timothy G Kingan
(74) *Attorney, Agent, or Firm* — Dority & Manning, P.A.

(57) ABSTRACT

Microfluidic devices, along with their methods of formation and use, are provided. The microfluidic device can include a substrate with a main channel and a first auxiliary channel defined in the substrate's surface. The main channel has a main width of about 1000 µm or less. The first auxiliary channel intersects with the main channel at a first aperture defined in a first side wall of the main channel. A second auxiliary channel can intersect with the main channel at a second aperture defined in a second side wall of the main channel. A plurality of main channels and respective auxiliary channel(s) can be included on the surface.

18 Claims, 17 Drawing Sheets

(56) References Cited

U.S. PATENT DOCUMENTS

| | | | |
|---|---|---|---|
| 2013/0190212 A1* | 7/2013 | Handique et al. | 506/37 |
| 2014/0221239 A1* | 8/2014 | Carman et al. | 506/9 |

OTHER PUBLICATIONS

Bergles et al., "On the Nature of Critical Heat Flux in Microchannels", Journal of Heat Transfer, vol. 127, Jan. 2005, 101-107.

Chang et al., "Two-phase flow instability for boiling in a microchannel heat sink", International Journal of Heat and Mass Transfer 50 (2007) 2078-2088.

Wu et al.., "Visualization and measurements of periodic boiling in silicon microchannels", International Journal of Heat and Mass Transfer 46 (2003) 2603-2614.

Qu et al., "Measurement and correlation of critical heat flux in two-phase micro-channel heat sinks", International Journal of Heat and Mass Transfer 47 (2004) 2045-2059.

Kandlikar, Satish G., "History, Advances, and Challenges in Liquid Flow and Flow Boiling Heat Transfer in Microchannels: A Critical Review", Journal of Heat Transfer, vol. 134, Mar. 2012. 034001-1-15.

Cheng et al., "Recent Work on Boiling and Condensation in Microchannels", Journal of Heat Transfer, vol. 131, Apr. 2009, 043211-1-15.

Thome, John R., "State-of-the-Art Overview of Boiling and Two-Phase Flows in Microchannels", Heat Transfer Engineering 27 (9), 2006, 4-19.

Qu et al., "Measurement and prediction of pressure drop in two-phase micro-channel heat sinks", International Journal of Heat and Mass Transfer 46 (2003) 2737-2753.

Kandlikar et al., "Stabilization of Flow Boiling in Microchannels Using Pressure Drop Elements and Fabricated Nucleation Sites", Journal of Heat Transfer, vol. 128, Apr. 2006, 389-396.

Mudawar, Issam, "Assessment of High-Heat-Flux Thermal Management Schemes", IEEE Transactions on Components and Packaging Technologies, vol. 24, No. 2, Jun. 2001, 122-141.

Liu et al., "Critical Heat Flux of Steady Boiling for Subcooled Water Jet Impingement on the Flat Stagnation Zone", Journal of Heat Transfer, vol. 126, Apr. 2004, 179-183.

Bar-Cohen et al., "Direct Liquid Cooling of High Flux Micro and Nano Electronic Components", Proceedings of the IEEE, vol. 94, No. 8, Aug. 2006, 1549-1570.

Kandlikar et al., "Evaluation of Jet Impingement, Spray and Microchannel Chip Cooling Options for High Heat Flux Removal", Heat Transfer Engineering 28 (11), 2007, 911-923

Kandlikar et al., "Scale effects on flow boiling heat transfer in microchannels: A fundamental perspective", International Journal of Thermal Sciences 49 (2010) 1073-1085.

Wang et al., "Unstable and stable flow boiling in parallel microchannels and in a single microchannel", International Journal of Heat and Mass Transfer 50 (2007) 4297-4310

Fogg et al., "Bubble-Induced Water Hammer and Cavitation in Microchannel Flow Boiling", Journal of Heat Transfer, vol. 131, Dec. 2009, 121006-1-12.

Vengallatore et al., "Self-assembly of micro- and nanoparticles on internal micromachined silicon surfaces", Sensors and Actuators A 113 (2004) 124-131.

Koşar et al., "Boiling heat transfer in rectangular microchannels with reentrant cavities", International Journal of Heat and Mass Transfer 48 (2005) 4867-4886.

Kline et al., "Describing Uncertainties in Single-Sample Experiments", Mechanical Engineering 75 (1) (1953) 3-8.

Liu et al., "Prediction of the onset of nucleate boiling in microchannel flow", International Journal of Heat and Mass Transfer 48 (2005) 5134-5149.

Kuo et al., "Bubble Dynamics During Boiling in Enhanced Surface Microchannels", Journal of Microelectromechanical Systems, vol. 15, No. 6, Dec. 2006, 1514-1527.

Kuo et al., "Flow Boiling Instabilities in Microchannels and Means for Mitigation by Reentrant Cavities", Journal of Heat Transfer, vol. 130, Jul. 2008, 072402-1-10.

Yang et al., "High frequency microbubble-switched oscillations modulated by microfluidic transistors", Applied Physics Letters 101 (2012) 073509-1-4.

Kubo et al., "Effects of Size and Number Density of Micro-reentrant Cavities on Boiling Heat Transfer from a Silicon Chip Immersed in Degassed and Gas-dissolved FC-72", Journal of Enhanced Heat Transfer, vol. 6 (1999) 151-160.

Kennedy et al., "The Onset of Flow Instability in Uniformly Heated Horizontal Microchannels", Journal of Heat Transfer, vol. 122, Feb. 2000, 118-125.

Zhang et al., "Phase change phenomena in silicon microchannels", International Journal of Heat and Mass Transfer 48 (2005) 1572-1582.

Prakash et al., "Microfluidic Bubble Logic", Science, vol. 315, Feb. 9, 2007, 832-835.

Fuerstman et al., "Coding/Decoding and Reversibility of Droplet Trains in Microfluidic Networks", Science, vol. 315, Feb. 9, 2007, 828-831.

Kabov et al., "Evaporation and flow dynamics of thin, shear-driven liquid films in mirogap channels", Experimental Thermal and Fluid Science 35 (2011) 825-831.

Choi et al., "Surface wettability effect on flow pattern and pressure drop in adiabatic two-phase flows in rectangular microchannels with T-junction mixer", Experimental Thermal and Fluid Science 35 (2011) 1086-1096.

Raven et al., "Periodic Microfluidic Bubbling Oscillator: Insight into the Stability of Two-Phase Microflows", Physical Review Letters 97, Oct. 13, 2006, 154501-1-4.

Tsai et al., "A Thermal-Bubble-Actuated Micronozzle-Diffuser Pump", Journal of Microelectromechanical, vol. 11, No. 6, Dec. 2002, 665-671.

Chen et al., "Bubble Growth and Ink Ejection Process of a Thermal Ink Jet Printhead", Int. J. Mech. Sci. vol. 39, No. 6, 1997, 683-695.

Deng et al., "The growth and collapse of a micro-bubble under pulse heating", International Journal of Heat and Mass Transfer 46 (2003) 4041-4050.

Andersson et al., "A valve-less diffuser micropump for microfluidic analytical systems", Sensors and Actuators B 72 (2001) 259-265.

Liu et al., "Active control of flow and heat transfer in silicon microchannels", Journal of Micromechanics and Microengineering 20 (2010) 1-16.

Schasfoort et al., "Field-Effect Flow Control for Microfabricated Fluidic Networks", Science, vol. 286, Oct. 29, 1999. 942-945.

Ory et al., "Growth and collapse of a vapor bubble in a narrow tube", Physics of Fluids, vol. 12, No. 6, Jun. 2000, 1268-1277.

Das et al., "Dynamics of a two-dimensional vapor bubble confined between superheated or subcooled parallel plates", Physical Review E 81, 2010, 046314-1-13.

Wang et al., "Unstable and stable flow boiling in parallel microchannels and in a single microchannel", International Journal of Heat and Mass Transfer 50 (2007) 4297-4310.

Wang et al., "Effects of inlet/outlet configurations on flow boiling instability in parallel microchannels", International Journal of Heat and Mass Transfer 51 (2008) 2267-2281.

Balasubramanian et al., "Experimental Study of Flow Patterns, Pressure Drop, and Flow Instabilities in Parallel Rectangular Minichannels", Heat Transfer Engineering, 26 (3), 2005, 20-27.

Xu et al., "Static and dynamic flow instability of a parallel microchannel heat sink at high heat fluxes", Energy Conversion and Management 46 (2005) 313-334.

Wu et al., "Boiling instability in parallel silicon microchannels at different heat flux", International Journal of Heat and Mass Transfer 47 (2004) 3631-3641.

Zhang et al., "Ledinegg instability in microchannels", International Journal of Heat and Mass Transfer 52 (2009) 5661-5674.

Rabaud et al, "Manipulation of confined bubbles in a thin microchannel: Drag and acoustic Bjerknes forces", Physics of Fluids 23, 2011, 042003-1-9.

(56) References Cited

OTHER PUBLICATIONS

Choi et al., "Adiabatic two-phase flow in rectangular microchannels with different aspect ratios: Part II—bubble behaviors and pressure drop in single bubble", International Journal of Heat and Mass Transfer 53 (2010) 5242-5249.

Koşar et al., "Suppression of Boiling Flow Oscillations in Parallel Microchannels by Inlet Restrictors", Journal of Heat Transfer, vol. 128, Mar. 2006, 251-260.

Kenning et al., "Confined growth of a vapour bubble in a capillary tube at initially uniform superheat: Experiments and modeling", International Journal of Heat and Mass Transfer 49 (2006) 4653-4671.

Aussillous et al., "Quick deposition of a fluid on the wall of a tube", Physics of Fluids, vol. 12, No. 10, Oct. 2000, 2367-2371.

Chandrasekaran et al., "Effect of microfabrication processes on surface roughness parameters of silicon surfaces", Surface & Coatings Technology 188-189 (2004) 581-587.

Wang et al., "A four-zone model for saturated flow boiling in a microchannel of rectangular cross-section", International Journal of Heat and Mass Transfer 53 (2010) 3439-3448.

Jacobi et al., "Heat Transfer Model for Evaporation of Elongated Bubble Flows in Microchannels", Journal of Heat Transfer, vol. 124, Dec. 2002, 1131-1136.

Thome et al., "Heat transfer model for evaporation in microchannels. Part 1: presentation of the model", International Journal of Heat and Mass Transfer 47 (2004) 3375-3385.

\* cited by examiner

ENHANCED FLOW BOILING IN MICROCHANNELS BY HIGH FREQUENCY MICROBUBBLE-EXCITED AND -MODULATED OSCILLATIONS

PRIORITY INFORMATION

The present application claims priority to U.S. Provisional Patent Application Ser. No. 61/741,952 titled "Enhanced Flow Boiling in Microchannels by High Frequency Microbubble-Excited and -Modulated Oscillations" of Li, et al. filed on Jul. 30, 2012, and to U.S. Provisional Patent Application Ser. No. 61/742,009 titled "High Frequency Microbubble-Switched Oscillations Modulated by Microfluidic Transistors" of Li, et al. filed on Aug. 1, 2012; the disclosures of which are incorporated by reference herein.

BACKGROUND

Two-phase flow instabilities are challenging issues hindering the practical implementation of flow boiling in micro domains. In particular, parallel channels instability, upstream compressible volume instability, and the critical heat flux (CHF) condition are common at the micro scale. The former two are characterized by low frequency and large temperature and pressure drop fluctuations. Flow instabilities can induce local dry-out between heated walls and attached vapor bubbles, and hence, lead to premature CHF conditions at low exit mass quality. Recent studies demonstrated that configurations of microchannels can suppress boiling instabilities and enhance several key flow boiling parameters including onset of nucleate boiling (ONB), heat transfer coefficient (HTC) and CHF. An example of reported configurations is inlet restrictors (IR) or valves/orifices to overcome reverse flows and mitigate boiling instabilities. Several studies have shown that other configurations, such as impingement jets, can effectively suppress flow reversal and at the same time enhance HTCs and CHFs.

Although the aforementioned techniques successfully enhanced nucleate boiling and suppressed the intrinsic instabilities during flow boiling in micro scale systems, the additional pressure drop ($\Delta p$) and power requirements introduced by those configurations are a major hindrance. For example, inlet restrictors or orifices can effectively suppress flow instabilities and enhance CHF, but, they increase the pressure drop by up to five-fold and cannot enhance flow boiling heat transfer rate. High flow resistance can cause critical issues, such as high pumping power and unpredictable coolant leakage. Similarly, comparing to microchannels with plain walls, the requirements in additional pumping power, arrangement of jets, and the availability of proper pumps have hindered application of impingement jets. In summary, considering reliability issues and cost would impede practical applications of current practices.

Two-phase flows in microchannels are dominated by viscous and capillary flows, and thus, mixing can considerably enhance flow boiling heat transfer in microchannels. However, it is challenging to passively generate strong mixing in microchannels because of the aforementioned reasons. The reported two-phase oscillation (TPO) frequency ranges from 0.06 Hz to 2 Hz in the laminar flow regime without assistance of active controllers and actuations. To date, high frequency TPOs can only be achieved through local microsecond heating pulses with significant sacrifice of volumetric flow rates. The non-sustainable water hummer pulses driven by bubble growth and collapse process have been observed and modeled in a single microchannel.

SUMMARY

Objects and advantages of the invention will be set forth in part in the following description, or may be obvious from the description, or may be learned through practice of the invention.

Microfluidic devices are generally provided along with their methods of formation and use. In one embodiment, the microfluidic device includes a substrate with a main channel and a first auxiliary channel defined in the substrate's surface. The main channel has a main width of about 1000 μm or less. The first auxiliary channel intersects with the main channel at a first aperture defined in a first side wall of the main channel. In one embodiment, a second auxiliary channel can intersect with the main channel at a second aperture defined in a second side wall of the main channel. A plurality of main channels and respective auxiliary channel(s) can be included on the surface in one embodiment.

Other features and aspects of the present invention are discussed in greater detail below.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures, in which:

FIG. 14(b) showing bubble nucleation on the wall;

FIG. 14(c) showing that the bubble explosively grows and is confined;

FIG. 14(d) showing the liquid thin film between a confined bubble and the solid wall is drying out;

FIG. 14(e) shows the confined bubble rapidly collapsed when its front cap directly contacts with subcooled liquid and results in a bubble shrinkage and collapse;

FIG. 14(f) shows fluid flow from the auxiliary channel is jetted into the main channel by the pressure gradient established from the rapid bubble collapse;

FIGS. 16(a)-16(e) show HF-TPO model and experimental measurements, with

FIG. 16(a) showing a lumped system model where $R_{21}$ and $R_{22}$ are transient flow resistances in auxiliary channels as illustrated in FIG. 16(b) and FIG. 16(c) (the unit of R reads as "Pa s m⁻³"), and $R_1$ and $R_3$ denote flow resistance from a restrictor and the cross junction (i.e., from "source" to "drain") respectively, FIG. 16(b) showing periodic flow resistance in auxiliary channels during HF-TPO cycles within a period Δt, FIG. 16(c) showing periodic flow resistances during a BGC cycle in auxiliary channels were predicted by physical models and numerically fitted by a logistic function, where, $\Delta t_1 = t_1 - t_0$, $\Delta t_2 = t_2 - t_1$ and $\Delta t_3 = t_3 - t_2$ denote the bubble growing time prior to attaching on walls, the duration for liquid film evaporating and the time of a bubble sustaining and collapsing, respectively, FIG. 16(d) showing pressure drop oscillations around mean value in the main channel were measured by transducers at 1 kHz sampling rate and predicted numerically at the heat flux of 125 W/cm² and mass flux of 258 kg/m²·s, FIG. 16(e) showing TPO frequency measured by a high-speed camera ranges from 134 Hz to 613 Hz under various heat and mass fluxes and were compared with data on flow oscillations from other researchers.

DETAILED DESCRIPTION

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

A microchannel architecture two-phase heat exchanger is generally provided, along with its methods of manufacture. The microchannel architecture two-phase heat exchanger is, in one embodiment, built to enhance flow boiling in microchannels. As discussed in the Examples below, it has been demonstrated that this new microchannel architecture can considerably enhance flow boiling heat transfer rate, suppress two-phase flow stabilities, and enhance CHF conditions with a significant reduction in the pressure drop compared to microchannels with reentrant cavities and inlet restrictors. A visualization study was conducted to understand the enhancement mechanisms of the new system.

In the provided microchannel architecture two-phase heat exchanger, high frequency bubble growth/collapse process in microchannels can be passively excited and sustained to create two-phase flow oscillations and generate strong mixing. This, in turn, is an effective method to enhance flow boiling by promoting thin film evaporation, nucleate boiling, and advection. The management of compressible vapor slugs in the confinements and the high frequency of vapor slugs collapse can reduce the pressure drop and achieve self-stabilized two-phase flows by reshaping the Δp-G curves during flow boiling in microchannels. Since no extra activation method or moving parts was introduced, the present microchannel architecture can achieve compact and efficient cooling systems at low cost and with high reliabilities.

Figure 1:
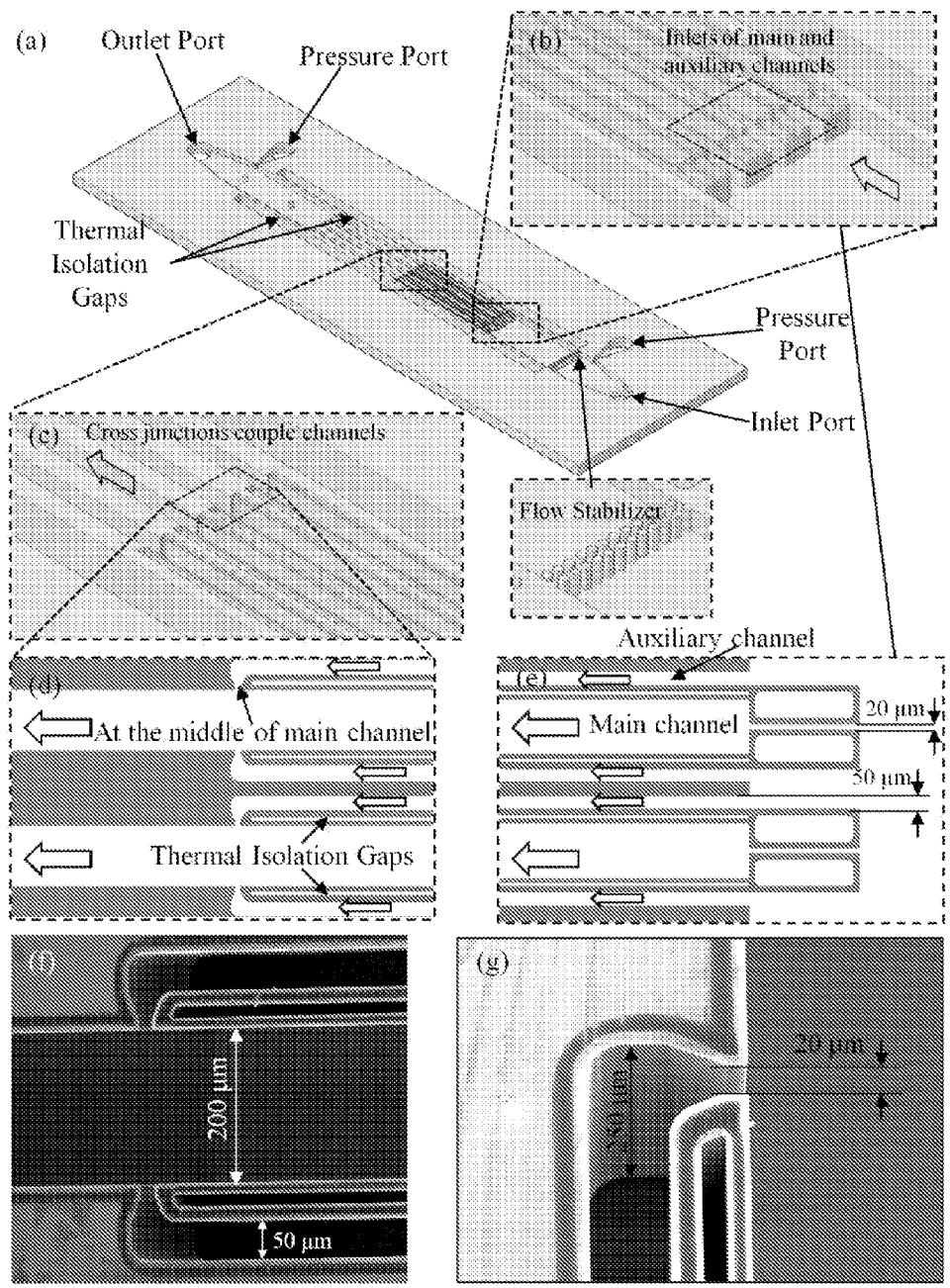
FIG. 1(a) shows a 3D CAD model of the present microchannel architecture.
FIG. 1(b) and FIG. 1(c) shows magnified views of entrance and cross-junction structures.
FIG. 1(d) and FIG. 1(e) shows top-viewed of cross-junctions and entrances.
FIG. 1(f) and FIG. 1(g) shows SEM images of the cross-junction.
Figure 13:
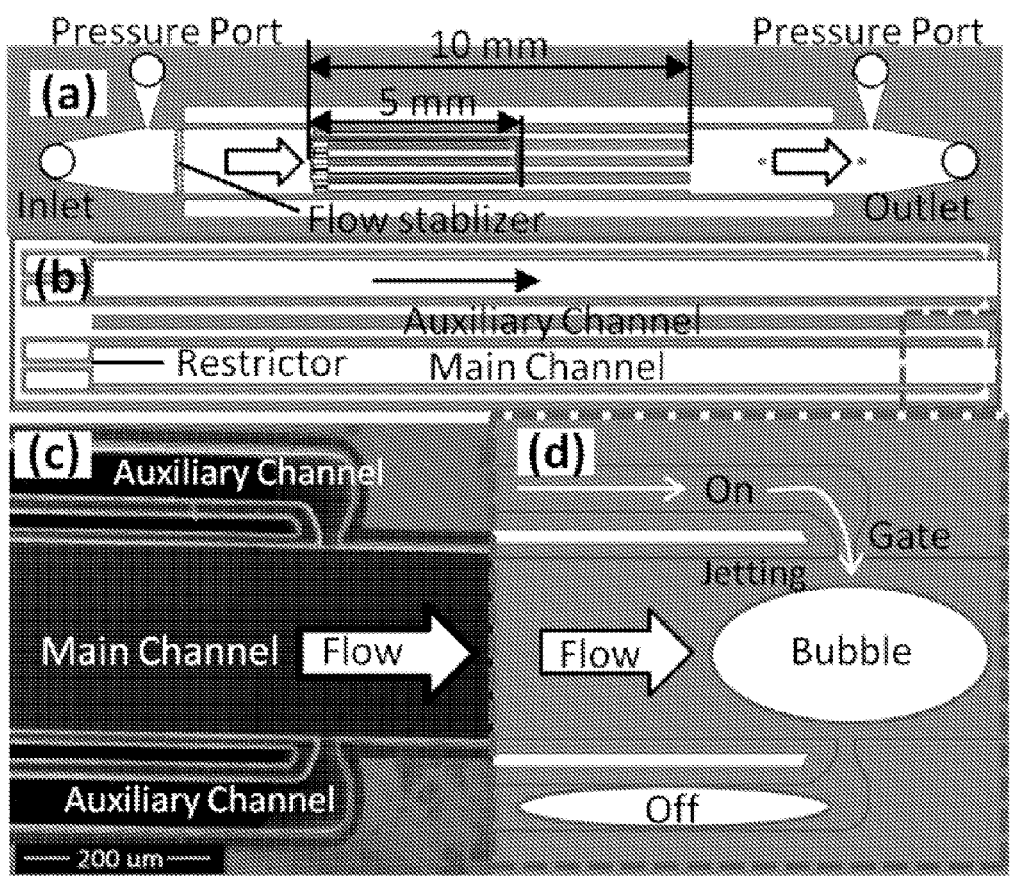
FIG. 13(a)-13(d) show the detailed structure of a test microdevice comprised of a microchannel array with microfluidic transistors, with FIG. 13(a) showing a diagram of the top-view of a microfluidic test chip, FIG. 13(b) showing an exploded view of auxilliary channels and main channels connected through cross-junctions highlighted by the dashed line, FIG. 13(c) showing a scanning electron microscope (SEM) image of an exemplary microfluidic transistor, and FIG. 13(d) showing a schematic mechanism of a microfluidic transistor according to the exemplary architecture of FIG. 13(c)

Referring to the embodiments shown in FIGS. 1 and 13, a microfluidic device is shown formed from a substrate having a surface defining at least one main channel and at least one auxiliary channel. For example, a first auxiliary channel can be positioned on one side of the main channel, and a second auxiliary channel can be positioned on the opposite side of the main channel, as more particularly shown in FIGS. 13(b), 13(c), and 13(d).

In the embodiments shown, the main channel is substantially parallel to its respective auxiliary channel(s) in its directional orientation (i.e., parallel along its length). Additionally, a thermal isolation gap is positioned between the main channel and each auxiliary channel, as shown in FIG. 1(d). The thermal isolation gap is positioned to minimize the thermal interaction between the fluid within the main channel and its adjacent auxiliary channel(s).

At least one auxiliary channel intersects with each main channel at an intersection. For example, when there are a first and second auxiliary channels positioned on either side of the main channels, each of the first auxiliary channel and the second auxiliary channel intersects with the main channel at a first intersection and second intersection, respectively. In the embodiment shown in FIG. 13(c), the first intersection and the second intersection are oriented substantially across from each other on the main channel. Each of the auxiliary channels intersect with the main channel at the intersection at an angle of about 75° to about 105° (e.g., about 90°).

The embodiments of FIGS. 1 and 13 show that the auxiliary channel is tapered at its intersection with the main channel, which is located at the aperture defined in the side wall of the main channel. That is, the aperture width in the side wall of the main channel can be about 15% to about 85% of the width of the auxiliary channel across its middle section, such as about 25% to about 80%. Thus, the width of the auxiliary channel is greater than the aperture defined in the side wall of the main channel (i.e., at the intersection of the auxiliary channel and the main channel). This tapered configuration at the terminal end of the auxiliary channel inhibits and/or prevents large bubbles within the auxiliary channel to pass into the main channel.

The main channel generally has a main width of about 1000 µm or less, such as about 50 µm to about 500 µm (e.g., about 100 µm to about 250 µm). Alternatively, the auxiliary channel has an auxiliary width across its middle section (i.e., defined as the middle point in the length) that is less than the main width. For example, the auxiliary width can be about 5% to about 50% of the main width, such as about 10% to about 40%.

As more particularly shown in the embodiments of FIGS. 1(e) and 13(b), the main channel defines a main inlet having a main inlet width that is narrower than the main width. For example, the main inlet width can be about 5% to about 75% of the main width, such as about 5% to about 50%. This narrower main inlet inhibits and/or prevents large bubbles within the main channel to move out of the main channel via the inlet. Thus, the flow of bubbles formed within the main channel can continue forward, and prevented from moving in reverse.

Figure 15:
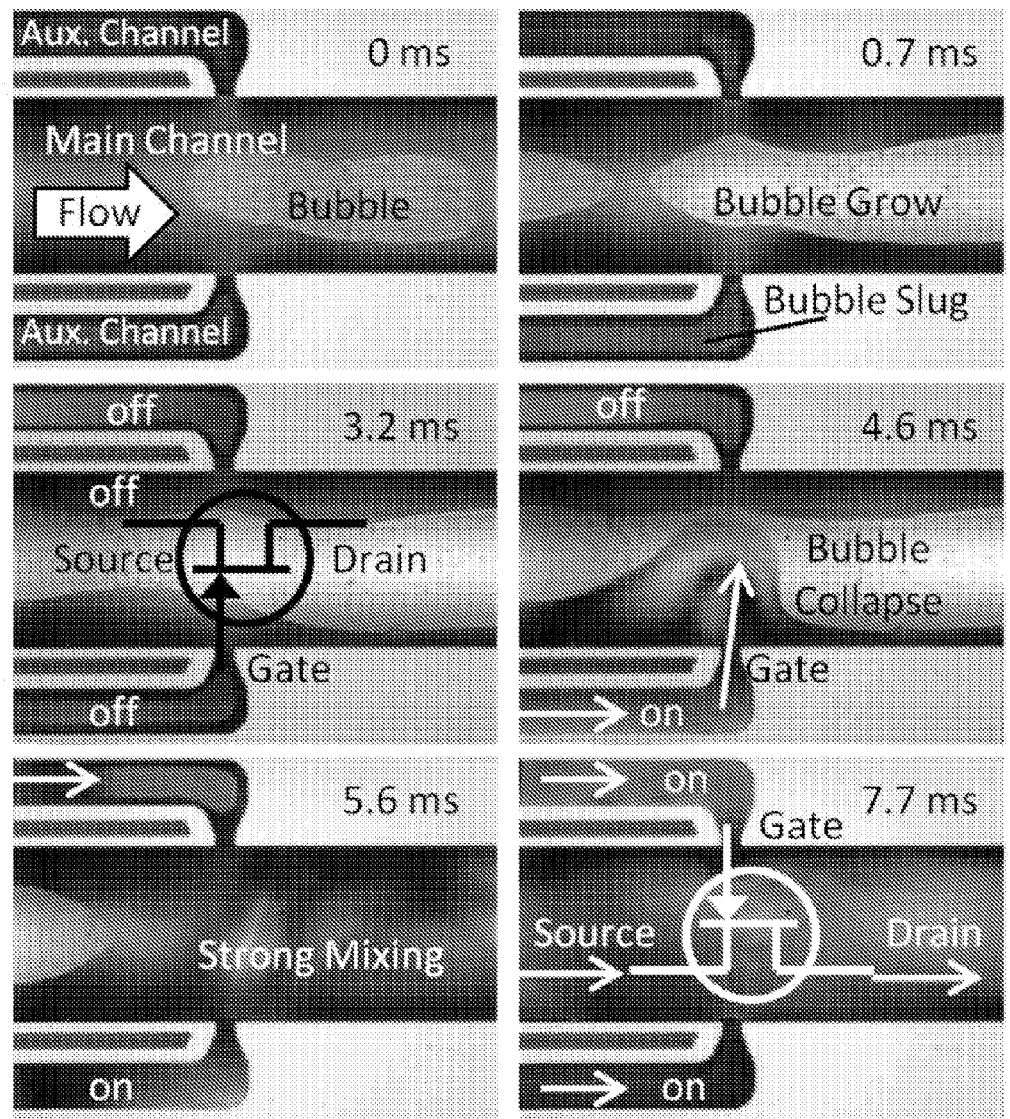
FIG. 15 shows a visualization of a detailed bubble growth/collapse cycle modulated by a microfluidic transistor (self-sustained under a constant heat and mass flux) at a mass flux of 150 kg m⁻² s⁻¹ (volumetric flow rate at 7.5 μL/s) and heat flux of 184 W cm⁻², the arrows showing the flow directions.

At the intersection of the auxiliary channel and the main channel, any bubbles formed in the main channel during fluid (e.g., liquid) flow can be collapsed by flow of the fluid from the auxiliary channel, as depicted in FIG. 15.

EXAMPLE 1

High frequency and sustainable TPOs (pulses) powered by vapor bubble growth and collapse processes in microchannels were successfully demonstrated to enhance flow boiling. Significant flow boiling heat transfer enhancement under constant heat fluxes was achieved. The high frequency oscillations and enhanced flow boiling were enabled by the novel microchannel architecture. Similar to microchannels with IR, high CHF values and suppression of flow instabilities were observed. However, HTCs were greatly enhanced with significant reduction in the pressure drop. The working mechanisms of this novel architecture have been discussed and revealed through visualization study.

A new microchannel architecture that included a main channel and two auxiliary channels connected at a cross junctions in a unit, has been successfully developed and fabricated to dramatically enhance flow boiling in microchannels. Mass fluxes ranged from 150 kg/m²·s to 480 kg/m²·s. The novel actuation mechanism powered by the high frequency microscale vapor bubble growth and collapse can create and sustain strong mixing in microchannels. Comparing to microchannels with inlet restrictors and reentrant cavities, the average two-phase heat transfer coefficient has been improved up to 88% with 71% to 90% reduction in pressure drop under similar working conditions. Critical heat flux of 552 W/cm² at a mass flux of 480 kg/m²·s was demonstrated. Flow and heat transfer mechanisms were studied and discussed.

Figure 2:
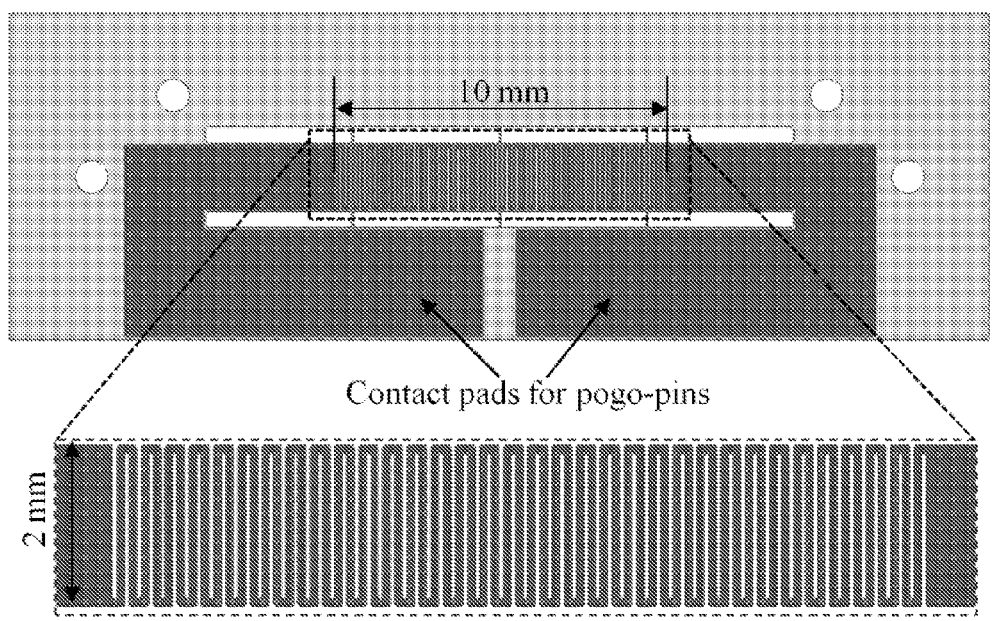
FIG. 2 shows a built-in micro heater for use with the microchannel device shown in FIG. 1.

1. Experimental Apparatus and Procedures 1.1. The Design of a Novel Microchannel Architecture As shown in FIG. 1, a unit of a novel microchannel architecture presented in this study consists of one main channel (H=250 µm; W=200 µm; L=10 mm) and two auxiliary channels (H=250 µm; W=50 µm; L=5 mm) coupled at a cross junction. The IRs (H=250 µm; W=20 µm; L=400 µm) were integrated with each main channel. Although the primary objective of the novel microchannel architecture aims to create sustainable high frequency two-phase oscillations to promote flow boiling, it can reduce hydraulic resistance by managing vapor slug expansion and through bypasses. A 1 mm diameter inlet port, 1 mm diameter outlet port, and two 1 mm diameter pressure ports were fabricated in a micro heat exchanger. The pressure drop between the inlet and the outlet of the microchannels was measured between two pressure ports. To minimize heat loss, two thermal isolation gaps (air gaps) were etched on both sides of microchannel arrays as shown in FIG. 1a. Flow stabilizers at the entrance of microchannels were used to evenly distribute flows. All channels share identical 250 µm depth but vary in the width. The inlet restrictors are 400 µm long and 20 µm wide. Additionally, air gaps were designed between the auxiliary channels and the main channels to reduce the conjugation heating and hence assure independent thermodynamics and bubble dynamics in individual channels. Two openings on both sidewalls of the main-channel were made as shown in FIG. 1f. This structure connects two secondary channels at the middle of a main-channel. The width of the wall opening between secondary channels and main-channels is 20 µm (FIG. 1g). A micro heater, which was patterned by aluminum thin-film, was deposited onto the back side of silicon microchannels, as shown in FIG. 2. The heating area is 10 mm by 2 mm, which is identical to the total base area of all microchannels and walls. This heater also serves as thermistors to monitor the average temperature of heating area by measuring the electrical resistance.

1.2. Design and Fabrication of the Microchannel Device

Figure 3:
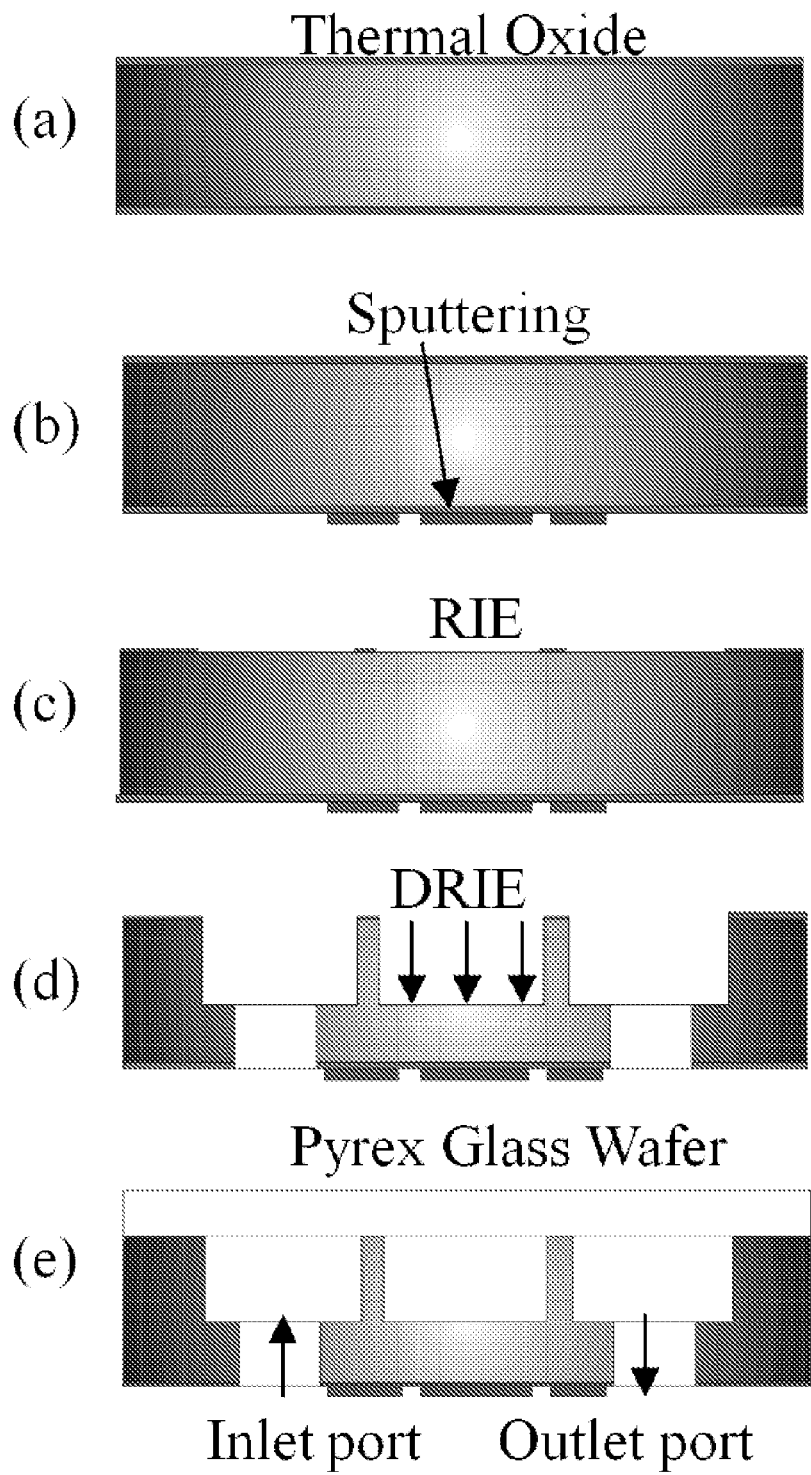
FIGS. 3(a)-3(e) sequentially show the major fabrication steps according to one exemplary method of forming a microchannel device.

The microchannel heat exchangers were made from a silicon wafer bonded to a Pyrex wafer by standard microfabrication processes, as shown in FIG. 3.

This process started with a double-side-polished n-type <100> silicon wafer. First, 1 µm thick thermal oxide layers were grown on both sides of the silicon wafer. The silicon oxide thin-film provided good electrical insulation for micro heaters and acted as a mask for deep reactive ion etching (DRIE) in subsequent microfabrication steps. A 500 nm thick oxide layer was deposited onto the front side as a shield layer by plasma-enhanced chemical vapor deposition (PECVD). Next, a 7 nm thick adhesive layer of titanium was initially deposited on the backside of the silicon wafer by DC sputtering followed by sputtering a 1 μm thick layer of aluminum. Once the thin-films were successfully deposited, a built-in thin film heater was made on the backside of the wafer by photolithography and wet etching (FIG. 2b). A 500 nm thick PECVD oxide layer was then deposited to protect the thin film heater in the following fabrication processes.

After the heater was formed on the backside, a pattern of microchannels on the top side of the wafer was formed on the silicon oxide through photolithography and reactive ion etching (RIE), which served as a mask. The area under the oxide mask was protected and the remaining areas were etched out to create 250 μm deep trenches by DRIE. The DRIE process formed deep vertical sidewalls with a root mean square (RMS) roughness of ~300 nm.

Inlet and outlet ports, air gaps, and pressure ports were created on the backside of the wafer by DRIE. Photolithography and wet etching (using 6:1 buffered oxide etchant) was used to remove patterned oxide so that these through-holes can be etched through the wafer by DRIE (FIG. 3d). RIE was used to remove patterned oxide coatings on the backside to expose contact pads.

A Pyrex glass wafer was anodically bonded to the silicon substrate to seal the device as shown in FIG. 3e. The transparent glass cover also served as observation windows in the visualization studies. The individual microchannel test chips (Length 30 mm; Width 10 mm; Thickness 1 mm) were cut from the wafer by a dicing saw.

1.3. Experimental Setup

Figure 4:
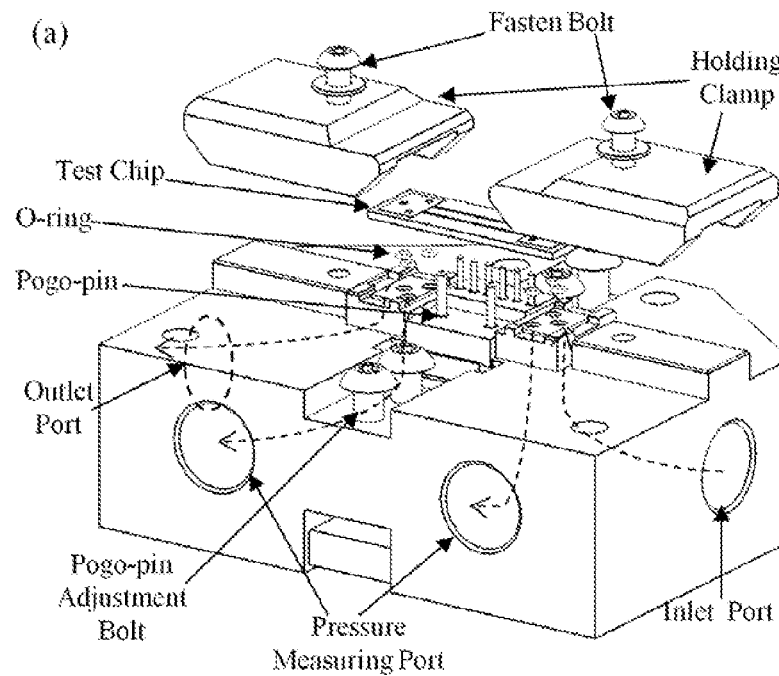
FIG. 4(a) shows an exploded 3D model of testing package module, which provides hydraulic and electrical connections.
FIG. 4(b) shows an exemplary two-phase testing platform for use in the module of FIG. 4(a)
Figure 4:
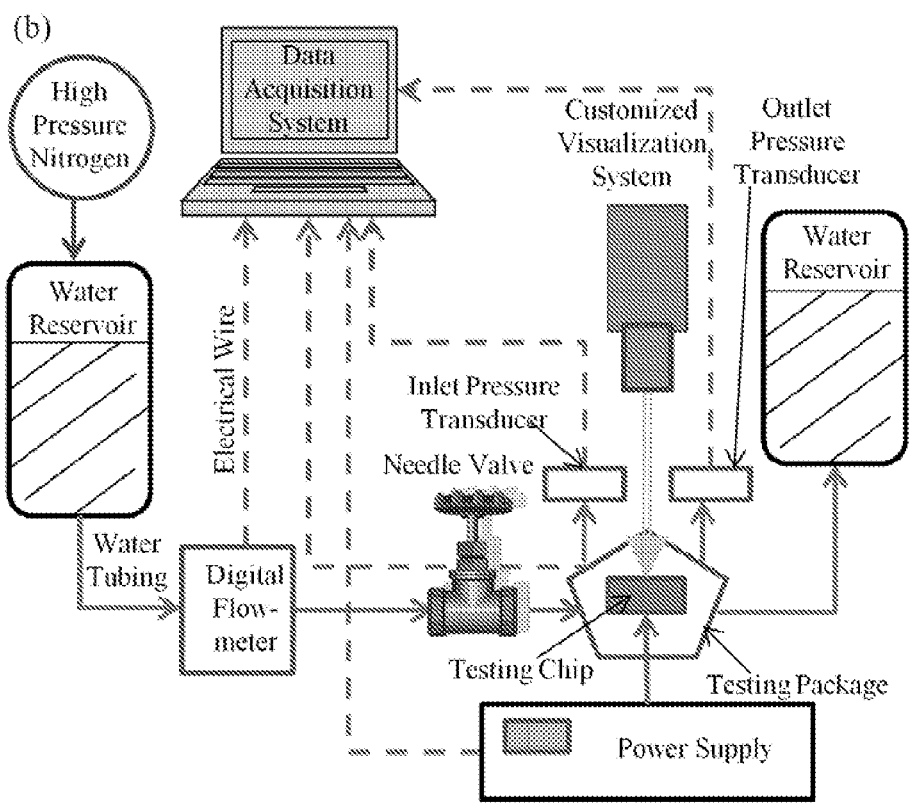

The two-phase test platform was built to conduct experimental studies as shown in FIG. 4. The microchannel test chip was placed at the middle of the test package module (FIG. 4a). This test package module provides hydraulic ports and electrical connections. Mechanical fasteners consist of two bolts and two holding clamps were used to fix and fasten the microchannel test chips by mechanical force. The microchannel test chips were fixed at two ends, but with the middle suspended. This packaging was designed to minimize tighten stresses on thin-film thermistors/heater and to reduce heat loss. Six micro o-rings between a silicon microchannel test chip and the test package were used to achieve mechanical seals. Probe-pins were placed under the backside of the device. Two bolts were used to adjust the heights of the probe-pins to eliminate electrical contacts resistance between the probe-pins and the contact pads of the microchannel. Two pressure transducers were installed on the pressure ports to measure pressure drops.

Major components of the experimental setup include optical imaging system, data acquisition unit, and an open loop for coolant supply (FIG. 4b). A pressurized water tank was used to supply de-ionized (DI) water. DI water was pre-degassed prior to tests and pumped by compressed nitrogen ($N_2$). Mass fluxes were measured by Sensiron ASL1600 flowmeter with 0.03 kg m$^{-2}$ s$^{-1}$ resolution. Electrical power was supplied by a high precision digital programmable power supply. The partial voltage on the micro heater was measured by an Agilent digital multimeter. Two thermocouples were used to measure the inlet and outlet fluid temperatures. Flow rate, local pressures, inlet and outlet temperatures, voltages and currents on the built-in heater were recorded automatically by a customized data acquisition system developed from NI LabVIEW. A customized visualization system comprised of a high-speed camera (Phantom V 7.3) with 256×256 pixels at approximate 40,000 frames per second and an Olympus microscope (BX-51) with 400× amplifications was developed to study bubble dynamics.

1.4. Experimental Procedure

Prior to tests, the heat loss as a function of temperature difference between a microchannel test chip and the ambient was evaluated. The temperature of the test chip in steady state was plotted as a function of input heat fluxes without fluid flows. Thus, the heat losses as a function of steady state temperature difference was obtained by linear curve fitting and used to estimate heat loss with high accuracy. The built-in heater (also function as a thermistor) was calibrated in an isothermal oven with a proportional-integral-derivative (PID) controller. The temperature as a linear function of electric resistance was generated by linear fitting. The confidence of correlation coefficient was estimated to be higher than 0.9999. The line slope is denoted by $S_f$.

After assembly of the microchannel test chip on the test package, the flow rate was kept constant at a set value ranging from 150 kg/m$^2$·s to 480 kg/m$^2$·s. A uniform input heat flux was applied by a digital power supply through the built-in heater at a step of approximate 2 W until approaching CHF. At each step, the data acquisition system recorded 120 sets of steady state experimental data including voltage, current, local pressures and temperatures of inlet and outlet in four minutes intervals.

2. Data Reduction
2.1. Flow Boiling Heat Transfer Rate

The electrical input power and resistance of the heater was calculated as, respectively, $$P = V \times I \tag{0}$$

and $$R = V/I \tag{0}$$

The average temperature of the built-in thermistor (i.e., the thin film heater) was calculated as, $$\overline{T}_{heater} = S_f(R - R_a) \tag{0}$$

where $R_a$ is the resistance of the micro heater at room temperature. The average wall temperature of the base area of the microchannel heat exchanger was estimated from the heater as $$\overline{T} = \overline{T}_{heater} - \frac{q''_{eff} t}{k_s} \tag{0}$$

where $q''_{eff} = P/A_b$.

Figure 5:
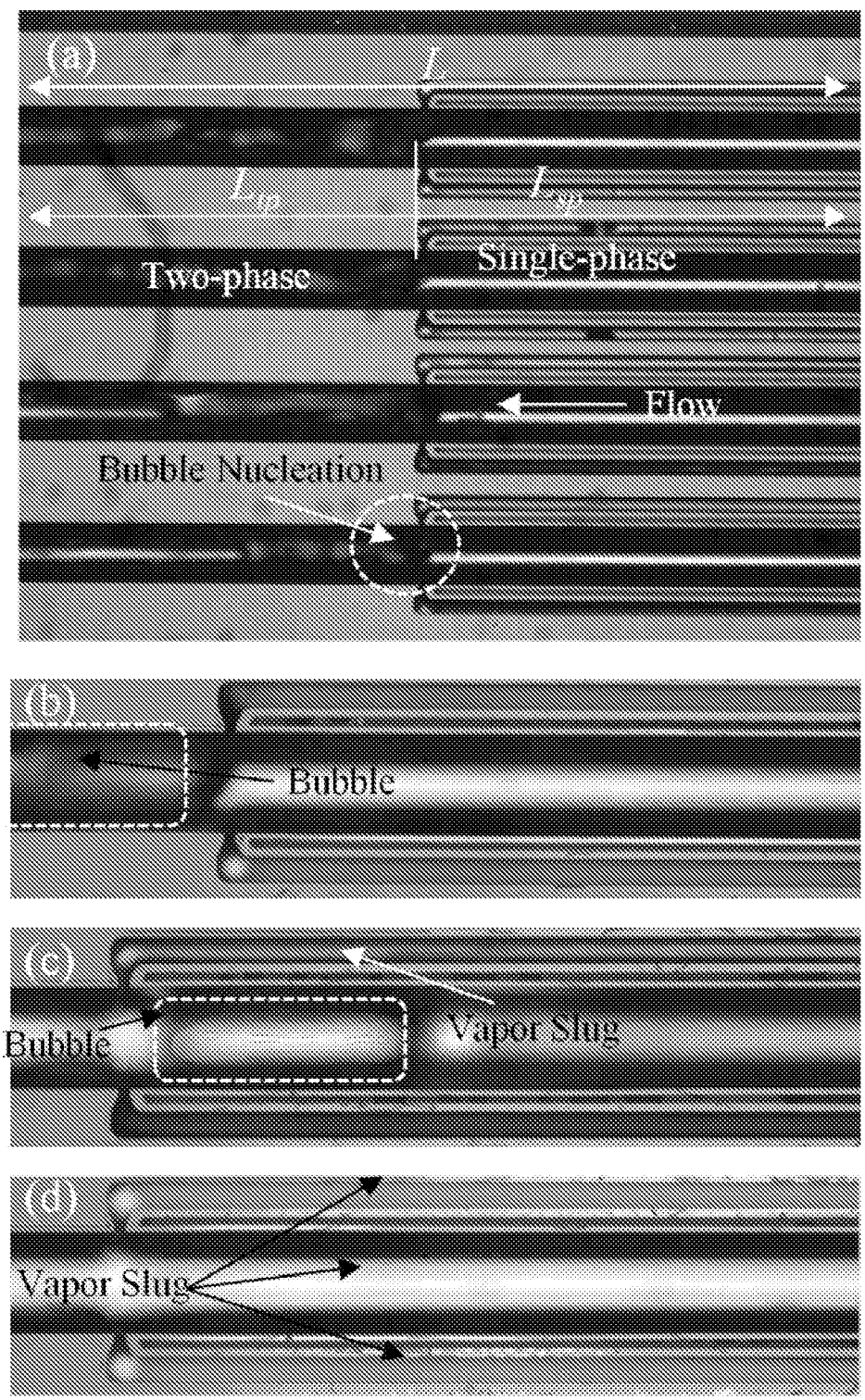
FIG. 5(a) shows single-phase flow and two-phase flow in the present microchannel architecture during subcooled flow boiling.
FIG. 5(b) shows bubble growth at incipient boiling stage, $\chi=0.10$.
FIG. 5(c) shows vapor slugs in all sections of microchannel during fully developed boiling, $\chi=0.27$.
FIG. 5(d) shows persistent vapor slug was observed, which cannot be removed in the front section of a main channel when boiling was approaching CHF, $\chi=0.49$.

Single-phase liquid exists at the entrance of microchannels during a sub-cooling flow boiling process (FIG. 5). The microchannels length (L) can be divided into two sections: single-phase region ($L_{sp}$) and two-phase region ($L_{tp}$) (FIG. 5). The length of the two sections was observed to vary significantly with vapor quality as shown from FIG. 5 b to d. The average two-phase heat transfer coefficient, $\bar{h}_{tp}$, was used to evaluate the heat transfer efficiency of flow boiling in two-phase region ($L_{tp}$) by excluding the weight of single-phase heat transfer from the average temperature. The single-phase heat transfer coefficient was calculated as, $$\overline{h}_{sp} = \frac{P}{[A_t - NA_f(1-\eta_f)][\overline{T}_{sp} - (T_i + T_e)/2]}$$

Where the pin fin efficiency was estimated from $\eta_f$=tan h(mH)/mH and m=$\sqrt{2\overline{h}_{sp}(L+W)/k_s WL}$. The average temperature in the single-phase region is the mean value of the inlet and exit surface temperatures in this region.

$$\overline{T}_{sp} = \frac{T_{in,sp} + T_{exit,sp}}{2}$$

In the above equation, the inlet and the exit surface temperatures were estimated as, $$T_{in,sp} = T_i + \frac{P}{\overline{h}_{sp}A_s};$$

$$T_{exit,sp} = T_{sat} + \frac{P}{\overline{h}_{sp}A_s};$$

The average temperature of the two-phase heat transfer region, $\overline{T}_{tp}$, was obtained by a weighted average method [30] in terms of the single-phase and average wall temperatures:

$$\overline{T}_{tp} = \frac{\overline{T}L - \overline{T}_{sp}L_{sp}}{L_{tp}}$$

These length values ($L_{sp}$ and $L_{tp}$) were measured through visualization. Taking into account fin effects on a single microchannel, the average two-phase heat transfer coefficient was calculated as, $$\overline{h}_{tp} = \frac{P}{(\sum(WL + 2HL\eta_f))(\overline{T}_{tp} - T_{sat})}$$

Because the thermal conductivity of Pyrex glass is approximately 1/150 of silicon, the interface between the microchannel walls and cover glass was assumed to be thermally insulated in the fin approximation. Then $\overline{h}_{tp}$ can be solved from Eq. 1 through 9 by an iterative method.

Additionally, the exit vapor quality can be calculated with mass flow rate and net input power according to:

$$\chi = \frac{P - \dot{m}C_p(T_{sat} - T_i)}{\dot{m}h_{fg}}$$

2.2. Uncertainty Analysis

Uncertainties of experimental variables were estimated and listed in Table 1. Uncertainties of measured values were adopted from the manufacturers' specification sheets, and the uncertainties of derived variables were calculated according to the propagation of uncertainty analysis.

3. Results and Discussion 3.1. Flow Boiling Curve

Figure 6:
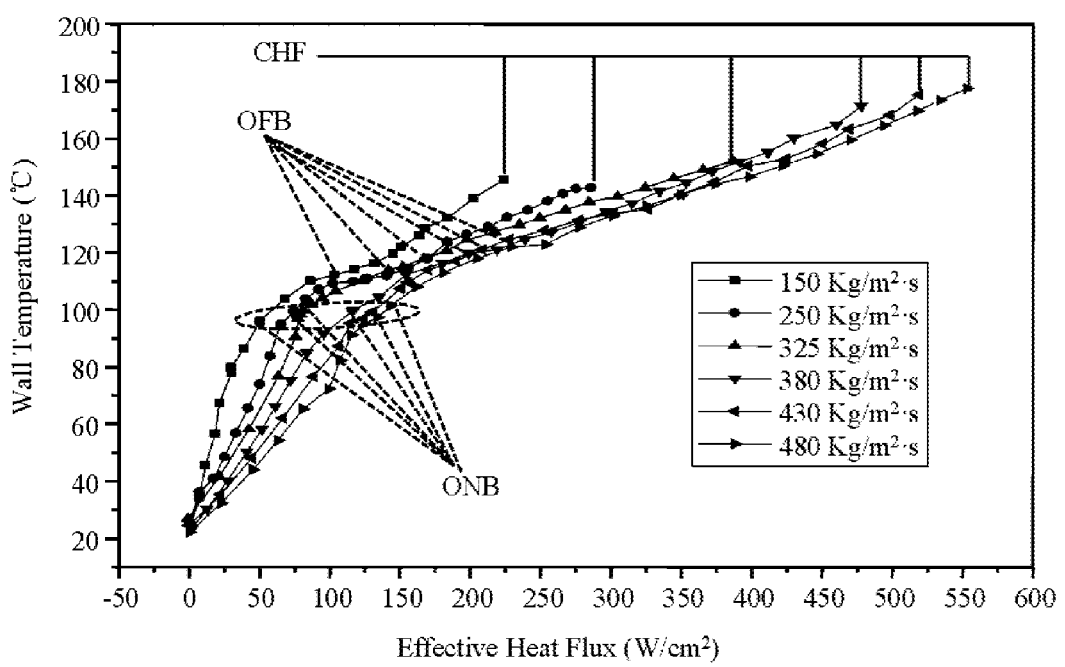
FIG. 6 shows boiling curves: average wall temperature T versus $q''_{eff}$.

The average wall temperature as a function of effective heat flux at different mass fluxes is shown in FIG. 6. CHF and ONB at different mass fluxes are labeled. Bubbly flow was observed following ONB (FIGS. 5a and 5b) during which the mass quality was relatively low so that interactions between isolated bubbles are not significant. In this study, the ONBs were greatly reduced to approximately saturated temperature, i.e., 100° C. It suggests that the superheat at ONB is low due to early incipient boiling. Previous research suggests that the superheat can be predicted from a heat flux at ONB point $q''_{ONB}$ in microchannels with smooth walls. The average superheats at ONB in this study are reduced to approximately 2° C., which is significantly lower than Liu et al. model prediction (i.e., ~12° C.) [32]. In the current microchannel architecture, the nozzles/openings on the side walls of the main channels (FIG. 1g) appears to function as artificial nucleate cavities that reduce ONB similar to observation in previous studies on engineered surfaces in microchannels. FIGS. 5a and 5b illustrates bubbles were nucleating initially near the nozzles on the side walls and propagating in the posterior region of the main channels ($L_{tp}$). In this study, onset of fully developed boiling (OFB) was defined as the first occurrence of nucleate boiling in all sections of the microchannels including the main channels ($L_{sp}$ section in FIG. 5a) and the auxiliary channels. When heat fluxes exceeded OFB, explosive bubbles grew inside the microchannels leading to direct condensation of vapor slugs, and hence complete collapse of the slugs in the microchannel (FIG. 5b). As a result, the high frequency microbubble-excited and -modulated two-phase oscillations were successfully created to dramatically enhance flow boiling heat transfer. The detailed oscillation mechanism has been detailed in a previous study.

3.2. Two-Phase Heat Transfer

Figure 7:
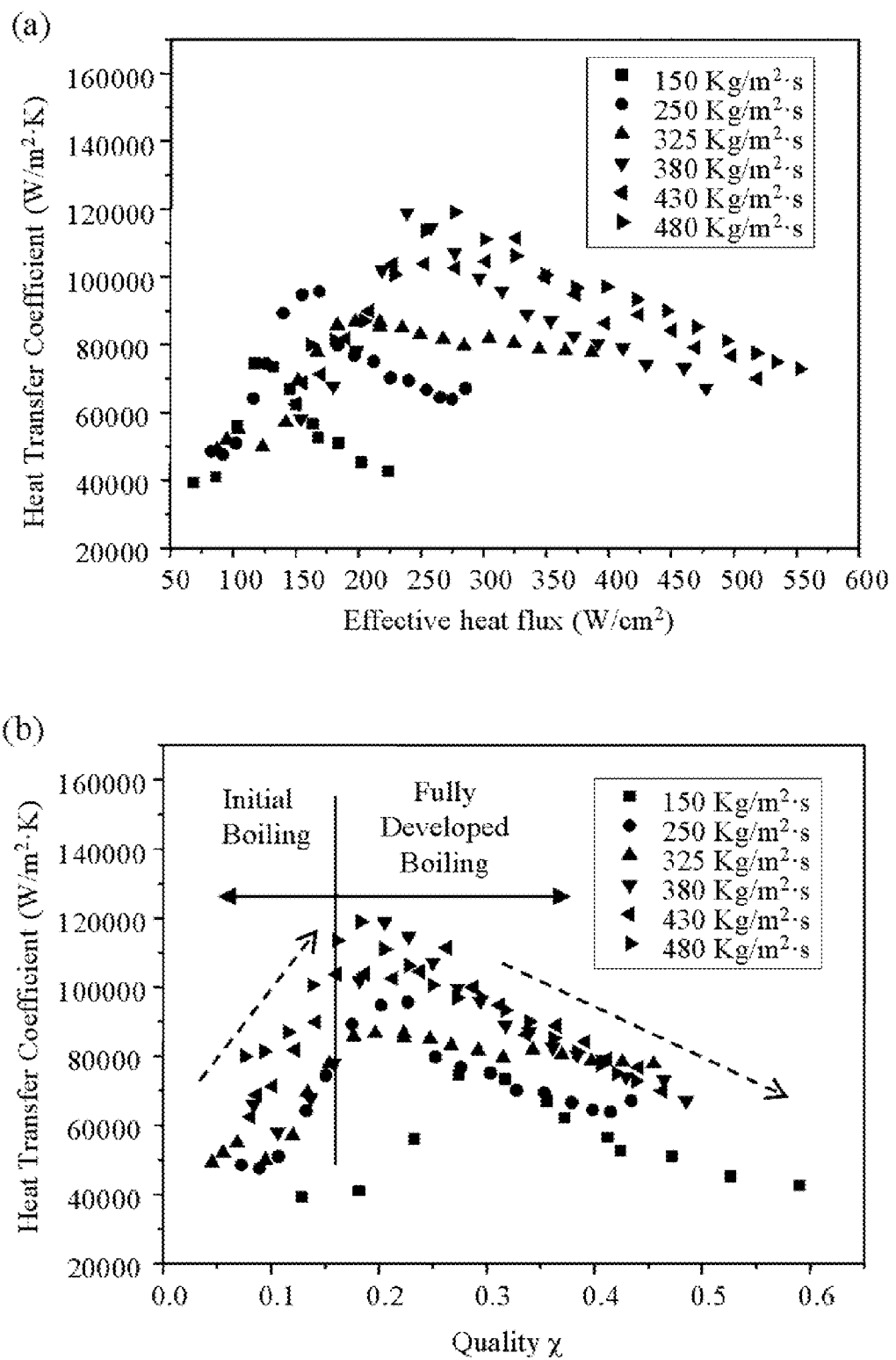
FIG. 7(a) shows average two-phase heat transfer coefficient $\bar{h}_{tp}$ versus effective heat flux $q''_{eff}$.
FIG. 7(b) shows $\bar{h}_{tp}$ versus exit vapor quality $\chi$.

Two-phase heat transfer coefficient as a function of effective heat flux and mass quality depicted in FIG. 7. The heat transfer coefficient initially increases until it reaches a peak during fully developed boiling and then gradually decreases with heat flux.

The bubble ebullition cycle initially started near the nozzles (highlighted by the dashed line in FIG. 5b). When heat flux was below the threshold required inducing explosive boiling, and hence, activating two-phase oscillations, the regions of single-phase ($L_{sp}$) and two-phase heat transfer ($L_{tp}$) had clear boundaries (FIG. 5a). With increasing heat flux, fully developed nucleate boiling gradually dominated in the front region of the main channels and in the auxiliary channels (FIG. 5c). The corresponding heat transfer coefficients were observed to increase sharply until reaching a peak value, which varies for different mass fluxes. As the mass quality increased, the two-phase heat transfer coefficients reached their maximum between exit qualities, $\chi$, ranging from 0.15 to 0.3. The maximum heat transfer coefficient achieved in this study was approximately 120 kW/m²·K at G=430 kg/m²·s and G=480 kg/m²·s. The mechanism responsible for such high heat transfer coefficient is believed to be related to the strong mixing induced by the high frequency TPOs as a result of the vapor slug growth/collapse process. The magnitude of TPO frequency was 100 Hz and the highest frequency in the present microchannel architecture was over 600 Hz. Heat transfer in microchannels during flow boiling is greatly enhanced by the strong mixing induced at such high frequencies. Mixing promotes advection, evaporation, because of the high frequency of liquid rewetting, and nucleate boiling because of the induced cavitations.

The gradual decline of the heat transfer coefficient is linked to the formation of vapor slugs with exit qualities above a certain threshold value in the main channels between the cross-junctions and the inlet (white areas) at high heat fluxes (FIG. 5d) where the high frequency TPOs has not affected the flows. With the absence of mixing induced by high frequency TPOs, forced convection and rewetting have not been enabled, which resulted in nearly 50% vapor-filled area and the resulting decrease in heat transfer coefficient. The appearance of such persistent vapor slug can be a result of the decline in condensation rate and increase in the evaporation rate at a high heat flux. The optimization of the location and number of cross-junctions could improve this situation by increasing direct condensation rates.

Figure 8:
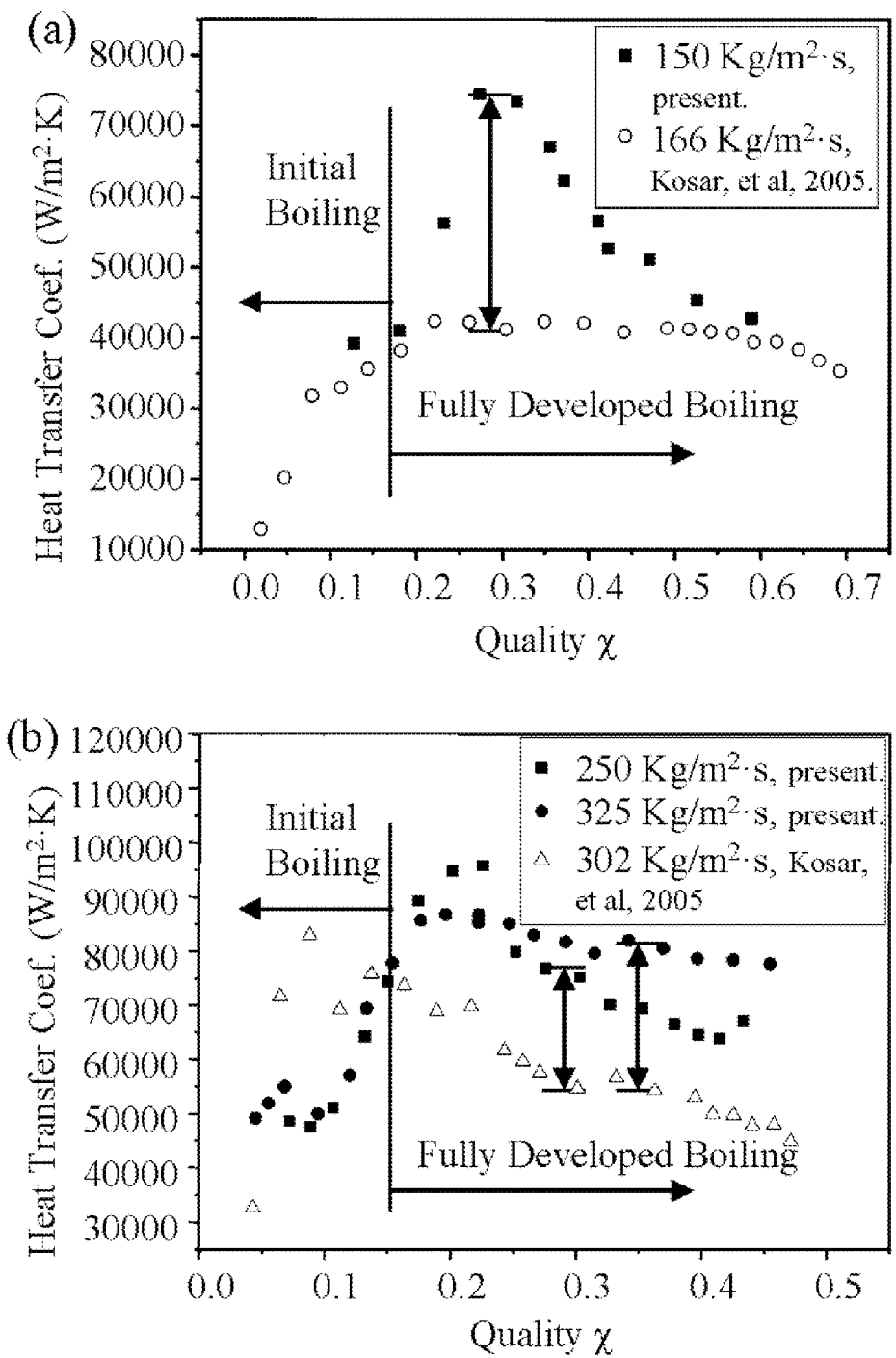
FIGS. 8(a) and 8(b) show comparisons of HTCs between the present microchannel architecture and microchannels with I.R. configuration and reentrant cavities (A. Kosar, et al.), with FIG. 8(a) at a low mass flux, and FIG. 8(b) at moderate mass fluxes.
Figure 9:
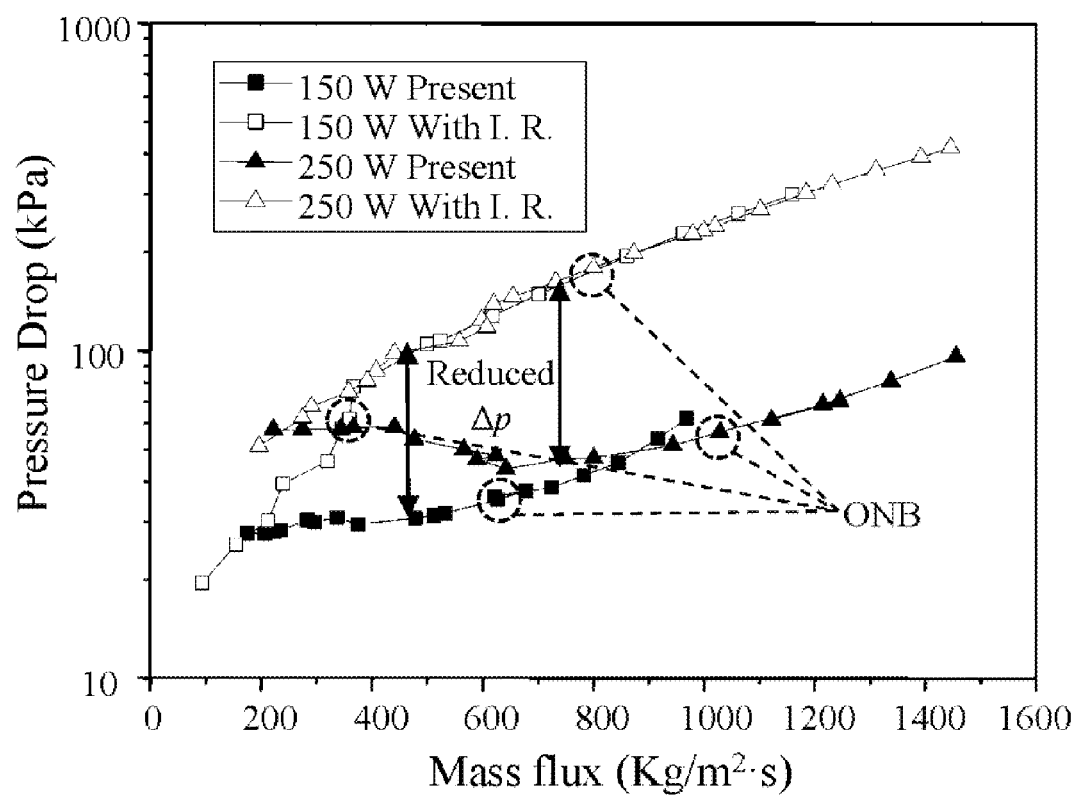
FIG. 9 shows Δp-G curves of flow boiling in present microchannel architecture and microchannels with I.R. configuration and reentrant cavities (A. Kosar, et al.)

3.3. Comparisons Between the Present Architecture and Microchannels with Reentrant Cavities and Inlet Restrictors Comparisons between the current microchannel architecture and microchannels with reentrant cavities and inlet restrictors (A. Kosar, et al., Boiling Heat Transfer in Rectangular Microchannels with Reentrant Cavities, Int. J. Heat Mass Transf., 48(23-24) (2005) 4867-4886) are shown in FIGS. 8 and 9. Experimental data in Ref. (A. Kosar, et al.) were selected because of the similar dimensions of the main channels and inlet restrictors. Additionally, all experimental data were reduced by the same method. Reentrant cavities have been developed to enhance flow boiling in microchannels (A. Kosar, et al.). Although the overall heat transfer coefficient in the present study has been significantly enhanced compared to microchannels with reentrant cavities and inlet restrictors (A. Kosar, et al.), there were several interesting observations. First, at low mass qualities, deviations in heat transfer coefficient between the present microchannel architecture and the microchannel configurations developed by Koş ar et al. is insignificant as shown in FIG. 8a. Although the heat transfer coefficient was dramatically increased during fully developed boiling, the heat transfer coefficient in the new microchannels rapidly decline after reaching an heat transfer peak and eventually overlapping with the boiling curve documented in (A. Kosar, et al.). The enhancement is believed to be the result of the induced strong mixing at low mass qualities. The enhancement from the reentrant cavities is not significant at low heat fluxes for both designs. Furthermore, the heat transfer coefficient, in the present heat exchangers are lower prior to reaching fully developed boiling than these reported in (A. Kosar, et al.) when the mass fluxes were moderate (FIG. 8b). The number of reentrant cavities are much larger in (A. Kosar, et al.) than in the current microchannel architecture. The enhanced nucleate boiling by reentrant cavities in (A. Kosar, et al.) is the primary cause when nucleate boiling is dominant. However, heat transfer rate in the present device is above that reported in (A. Kosar, et al.) during fully developed boiling, which suggests that the strong induced mixing inside the microchannels plays a critical role in enhancing two-phase heat transfer. In summary, heat transfer coefficient in the present microchannel architecture has been enhanced by up to 87% (FIG. 8a) and 57% (FIG. 8b) with approximately identical mass fluxes and heat fluxes compared to the configuration developed in (A. Kosar, et al.).

The pressure drop-mass flux ($\Delta$p-G) curves for heat fluxes of 150 W/cm$^2$ and 250 W/cm$^2$ are shown in FIG. 9. A pressure drop reduction of 71% to 90% compared to [30] for mass flux ranging from 400 kg/m$^2$·s to 1400 kg/m$^2$·s were observed. The significant reduction of the pressure drop can be a result of the increased cross-sectional area from the auxiliary channels (FIG. 1f) and the effective management of the confinements of compressible vapor bubbles enabled by high frequency bubble collapse as detailed in Section 3.5. For mass fluxes below 400 kg/m$^2$·s, the $\Delta$p-G curves of the two configurations gradually converge because pressure drop of single-phase vapor flow is dominated.

Additionally, as illustrated in FIG. 9, ONBs in the present microchannels were observed to be greatly reduced compared to microchannels with smooth walls for a given heat flux. This can be because the nozzles on both walls of the microchannels also serve as artificial nucleation sites.

Figure 10:
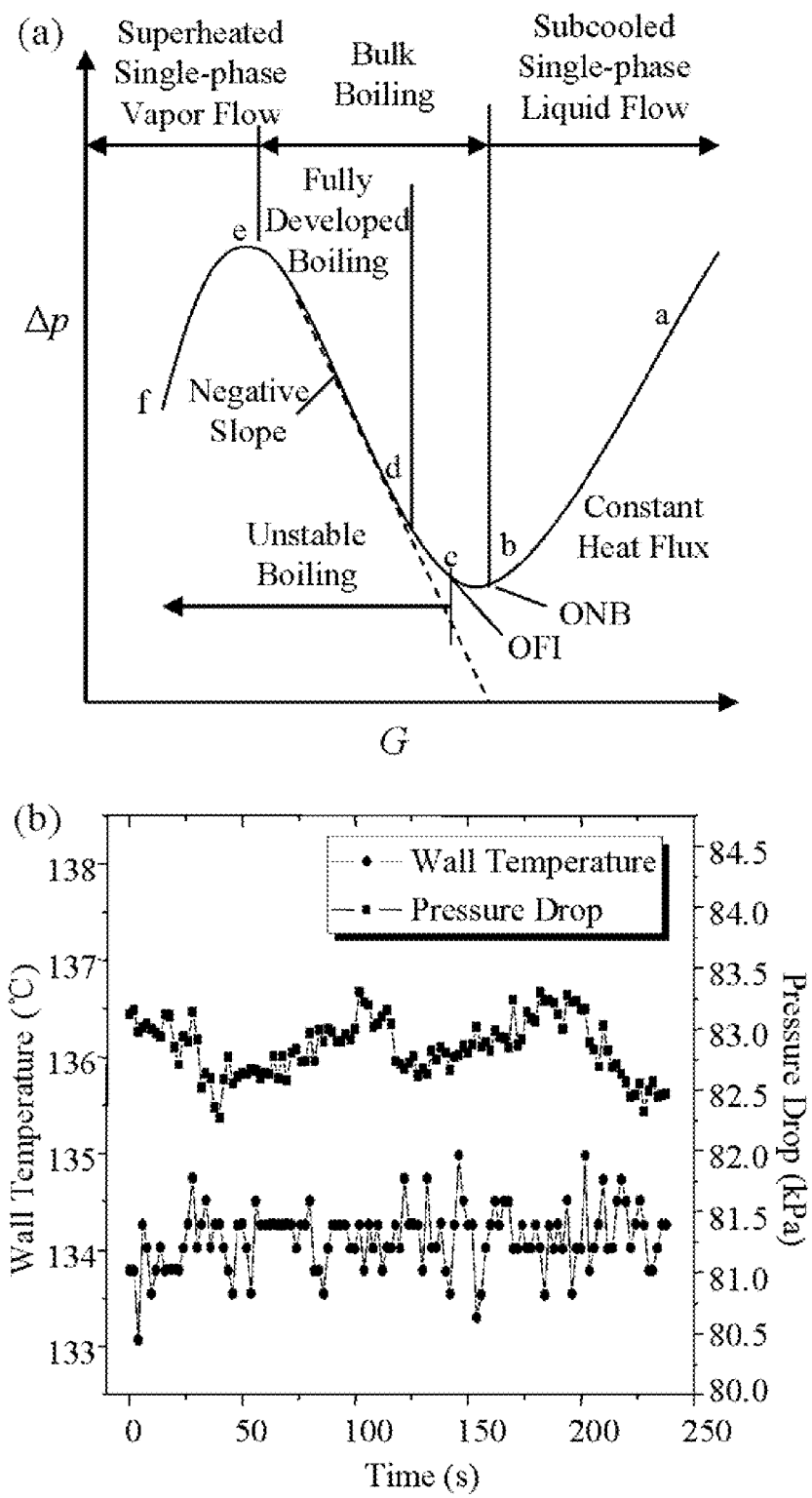
FIG. 10(a) shows a classic Δp-G curve of flow boiling in plain wall microchannels.
FIG. 10(b) shows a transient wall temperatures and pressure drops in 240 seconds at a mass flux of 380 kg/m²·s and effective heat flux of 296.6 W/cm² in present microchannel architecture according to the Examples.

3.4. Two-Phase Flow Instabilities $\Delta$p-G curves in FIG. 10a are used to analyze the Ledinegg instability in microchannels [1]. At high mass fluxes and for fixed heat flux, the pressure drop initially decreases with decreasing mass flux (a to b section in FIG. 10a) before reaching a minimum termed onset of flow instability (OFI). In microchannels, it has been argued that OFI corresponds to a mass flux only slightly less than ONB. As the mass flux continue to decrease past OFI, the pressure drop-mass flux slope changes course and becomes negative (Segment c to e in FIG. 10a). When this happens, i.e., when $$\frac{\partial(\Delta p)}{\partial G} \leq 0 \qquad (0)$$

the system is susceptible to the Ledinegg instability. Such two-phase flow instabilities are characterized by low frequencies and large amplitudes in the flow rate, pressure drops, and heat transfer coefficients [2, 4, 5, 10, 38] and usually result in premature CHF. Inlet restrictors (orifices) have been developed and demonstrated as an effective method to mitigate two-phase flow instabilities [13] by reshaping the $\Delta$p-G curve such that the curve is rendered positive. The $\Delta$p-G curves of the present heat exchanger at two heat fluxes, q"$_{eff}$=150 and 250 W/cm$^2$ are compared to microchannels with IR in FIG. 9. The slopes of these two $\Delta$p-G curves from microchannels with inlet restrictors are positive, which enables high CHF by suppressing instabilities [11-13], but, with a significant penalty in a form of elevated pressure drop [12, 13]. It has been observed that the slopes in the current systems were greatly moderated (the slope of $\Delta$p-G curve at 150 W/cm$^2$ is even positive). As a result, two-phase instabilities were suppressed such that high CHF was demonstrated, i.e., 552 W/cm$^2$ at a moderate mass flux of 480 kg/m$^2$·s (FIG. 6), within addition, a significant pressure drop reduction compared to microchannels with IR obtained in previous studies. Transient pressure drops and wall temperatures at a mass flux of 380 kg/m$^2$·s and effective heat flux of 296.6 W/cm$^2$ are shown in FIG. 10b. At such a high heat flux, pressure drop and wall temperature have been observed to fluctuate within 1.2% (1 kPa) and 1.5% (2° C.), which indicates highly stable two-phase flows.

3.5. Visualization Study

Figure 11:
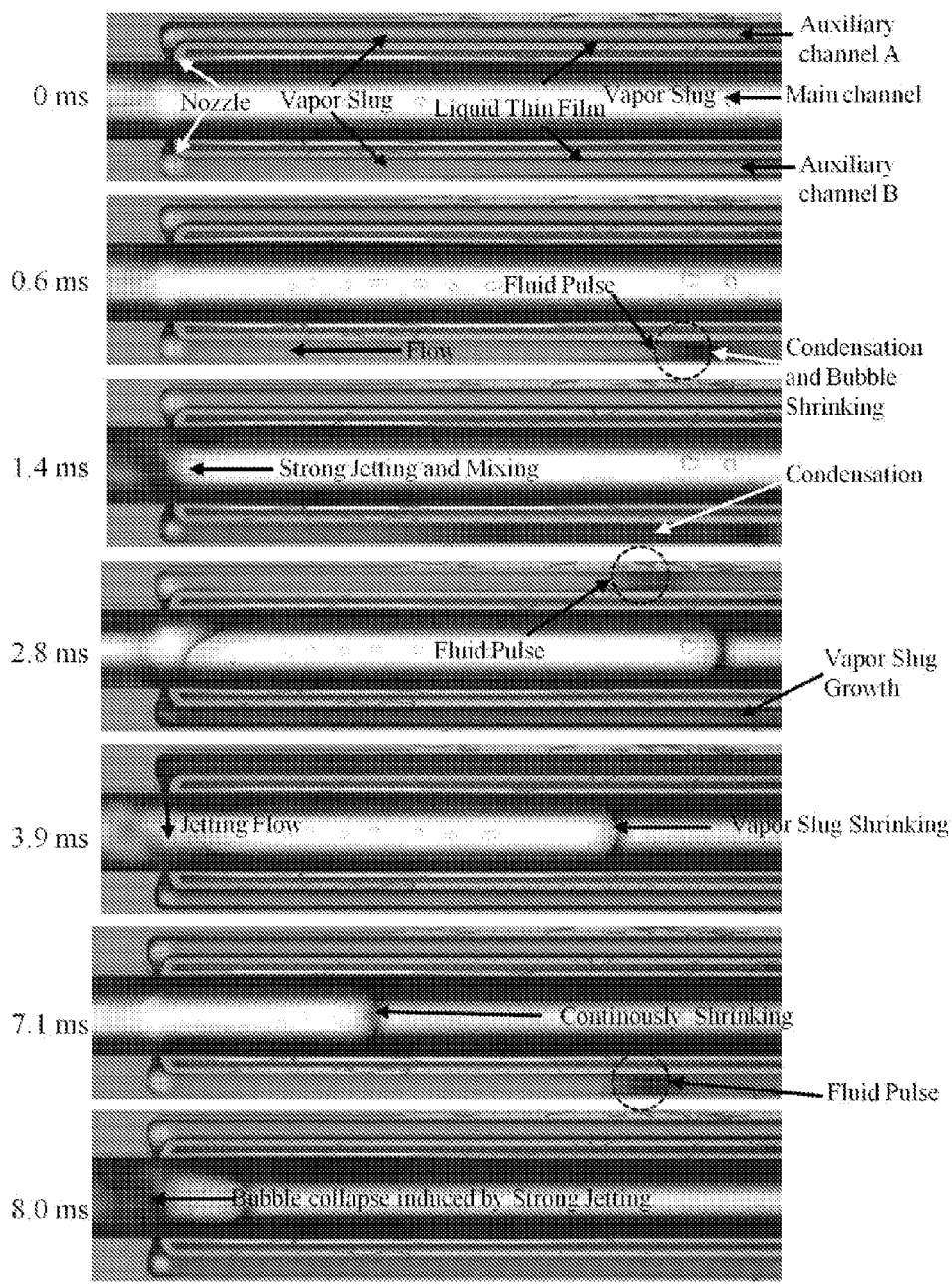
FIG. 11 shows high frequency two-phase oscillations powered by bubble growth/collapse processes at a heat flux of 100 W/cm² in a mass flux of 400 kg/m²·s.
Figure 12:
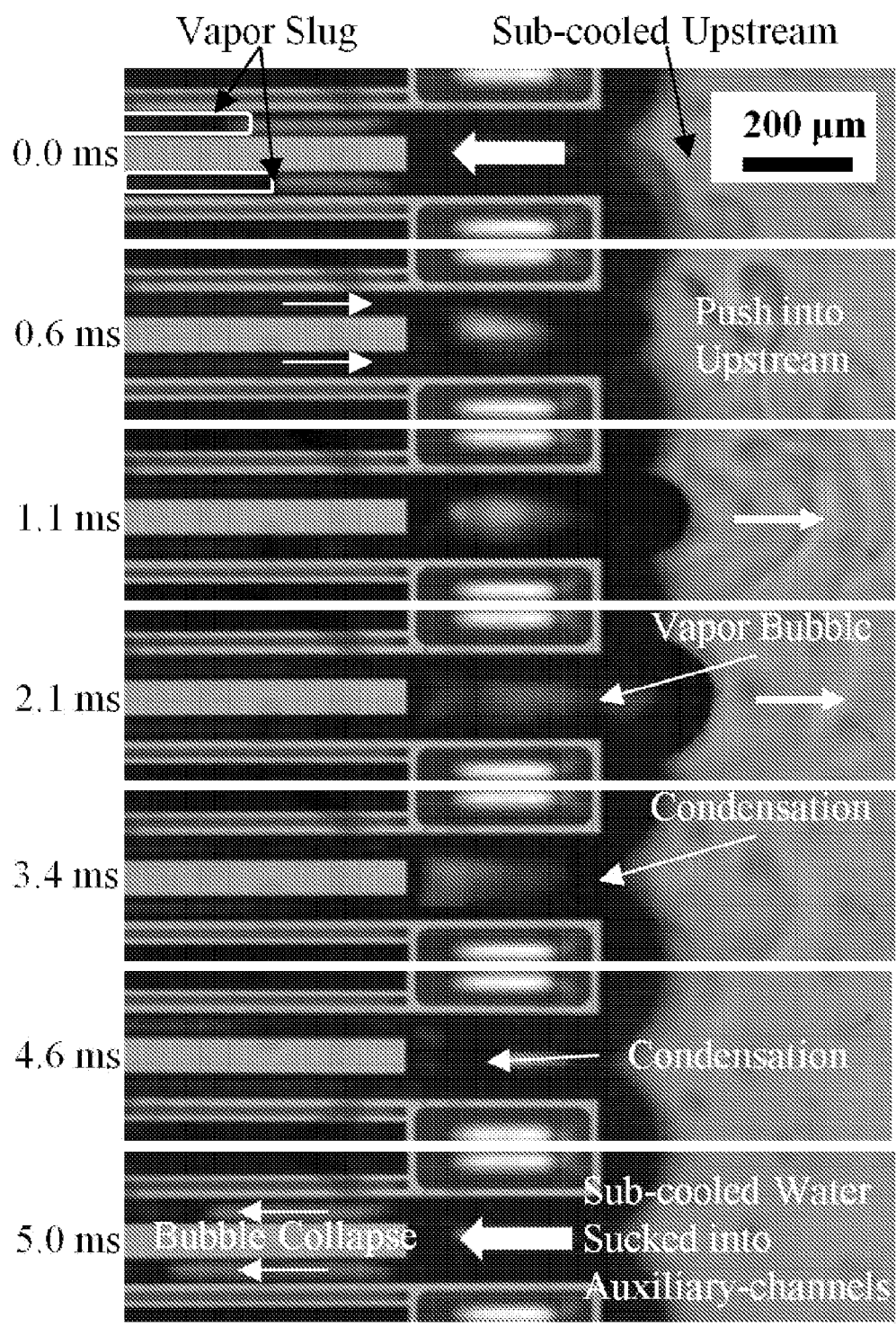
FIG. 12 shows a vapor slug expansion and collapse in the entrance area.

To mechanistically understand the enhancement of flow boiling discussed above, a visualization study was conducted using a high-speed imagery system (Phantom V7.3) and an Olympus microscope (BX-51). FIG. 11 shows seven frames selected from sequential images in 8 ms at 10,000 frames per second to represent the entire bubble ebullition processes near a cross-junction where two auxiliary channels and a main-channel are connected. The interactions between vapor slugs in auxiliary channels and subcooled liquid in the entrance of secondary channels are illustrated in FIG. 12.

FIG. 11 shows that vapor slugs filling auxiliary channel A and B triggered a bubble growth cycle. The time was marked as the starting time for the bubble ebullition cycle (i.e., t=0). Liquid thin film between the bubble slugs and the walls was observed. The vapor slugs in the auxiliary channels only expanded towards upstream, i.e., the subcooled region of the main channel due to the restriction of the converging nozzles. The vapor slug in auxiliary channel B was observed to shrink due to the direct condensation at 0.6 ms. The large vapor slug in the main channel was broken by the subcooled flow pumped through auxiliary channel B at 1.4 ms, which induced fluid pulses. From flow visualization, the velocity of the liquid jetting was shown to be nearly five times higher than the average liquid velocity from the inlet, i.e., accelerated. Alternatively, the vapor slug in auxiliary channel A started to shrink at 2.8 ms and completely collapsed at 3.9 ms, which led to a jetting flow via a converging nozzle and further shrinkage of the vapor slug in the main channel. This jetting flow is similar to water hammer in microchannels—the frequency of these pulses in the auxiliary channels and the main channel were measured to be approximately 100 and 200 Hz, respectively, at a heat flux of 100 W/cm$^2$ with a mass flux of 400 kg/m$^2$-s. The highest frequency of flow oscillations achieved in the present microchannel architecture was over 613 Hz. Such high frequency two-phase oscillations didn't affect the system temperature and pressure drop. The third fluid pulse in this observation period was created and accelerated into the cross-junction at 7.1 ms. A large vapor slug in the main channel was observed to completely collapse or removed at 8 ms, which significantly limits the impacts of bubble confinements and capillary force on two-phase flows in the microchannel. The walls in the microchannels can be wetted by high frequency two-phase oscillations, which, consequently, led to highly efficient heat transfer because of the enhanced thin-film evaporation and convection. It should be noted that nucleate boiling has been also greatly enhanced due to induced cavitations during the collapse of large vapor slugs.

Flow reversal driven by the rapid vapor slug expansion in the auxiliary channels was observed. The complete process of a vapor slug expansion and collapse due to direct condensation is shown in FIG. 12. Flow reversal appeared at time 0 ms. The vapor slug expanded toward the subcooled fluid in inlet region due to the restriction of the nozzles. The vapor slug volume reached a maximum value at 2.1 ms due to the evaporation and direct condensation reached equilibrium. Disappearance of the vapor slug fronts and reassumed subcooled flow in auxiliary channels indicated the collapse of vapor slug and the completion of the vapor slug ebullition process.

EXAMPLE 2

A parametric study was also conducted to assess the impacts of mass fluxes and input heat fluxes on the TPO frequency. The overlapped curves under various mass fluxes clearly indicated that the mass flux has not shown significant impacts on the TPO frequency. The TPO frequency was observed to increase with input heat flux, which suggests a strong dependence on the input heat flux. The increase of nucleate boiling and evaporation heat transfer rates with increasing heat flux is believed to be the primary reason to induce a higher bubble growing rate and hence a high TPO frequency.

In summary, a HF microbubble-switched oscillation mechanism has been conceptualized and experimentally demonstrated, which can be passively sustained and modulated by microfluidic transistors. A lumped model of HF-TPOs was developed and captured the major physical cycles of HF-TPOs. Efficiency of the mass and heat transfer in microfluidic systems would be dramatically enhanced because of the strong mixing introduced by HF-TPOs in micro domains, which holds promise to further advance high heat flux thermal management technologies as well as highly efficient and compact reactors and heat exchangers. Additionally, HF-TPOs have great potential to develop high performance chip-scale bubble-driven actuators.

Direct condensation was used to achieve high frequency collapse of confined bubbles in microchannels in a sustainable manner. The direct condensation method provided a significantly enhanced thermal bubble actuation mechanism under a constant heat flux and generated HF-TPOs. The experimental microfluidic unit utilized was comprised of one cross-junction, two auxiliary channels and one main channel as shown and described in FIG. 13. This device was conceptualized and termed a "microfluidic transistor", analogous to an electric transistor since it can passively sustain and modulate TPOs in microchannels. Fluid flows driven by a pressure gradient in microfluidic systems have been found to be analogous to electron transport in circuits.

In this study, fluid flows were represented as either in an "on" or "off" state in a bubble logic device, which is switched by a confined bubble. During flow boiling in microchannels, a bubble explosively grows and expands until it is confined and shaped by solid walls. In this situation, a confined bubble or vapor slug causes a sharp increase in the flow resistance or system pressure drop, where the flow is nearly blocked by the confined bubble (or vapor slug); and this represents as an "off" state in the bubble logic. The flows are switched to an "on" state when flow resistance is abruptly reduced due to the rapid bubble collapse enabled by direct condensation.

A microdevice was fabricated to experimentally demonstrate the actuation mechanism as illustrated in FIG. 13. The top view of the microdevice is shown in FIGS. 13a and 13b. Four ports (one for flow inlet, one for flow outlet and two for pressure measuring ports) were fabricated on a wafer. As an observation window, a 500 µm thick Pyrex glass wafer was bonded onto a 500 µm thick silicon wafer substrate. A thin film aluminum heater (10 mm×2 mm, see FIGS. 1 and 2) was integrated on the backside of the silicon chip to generate microbubbles at a constant heat flux (FIG. 13d). The dimensions (length, width, depth) of the main channels, auxiliary channels and restrictors were 10 mm×200 µm×250 µm, 5 mm×50 µm×250 µm and 0.4 mm×20 µm×250 µm, respectively. In order to trap bubbles and guide bubble expansion direction in the auxiliary and main channels, converging nozzles with 20 µm throat (FIG. 13c) and microscale inlet restrictors (FIG. 13b) were made in the auxiliary and main channels, respectively. In this study, deionized (DI) water was employed as the working fluid and supplied as a subcooled fluid (50° C. to 60° C.) from inlet and then heated by the thin film heater to generate bubbles in the microchannels.

Figure 14:
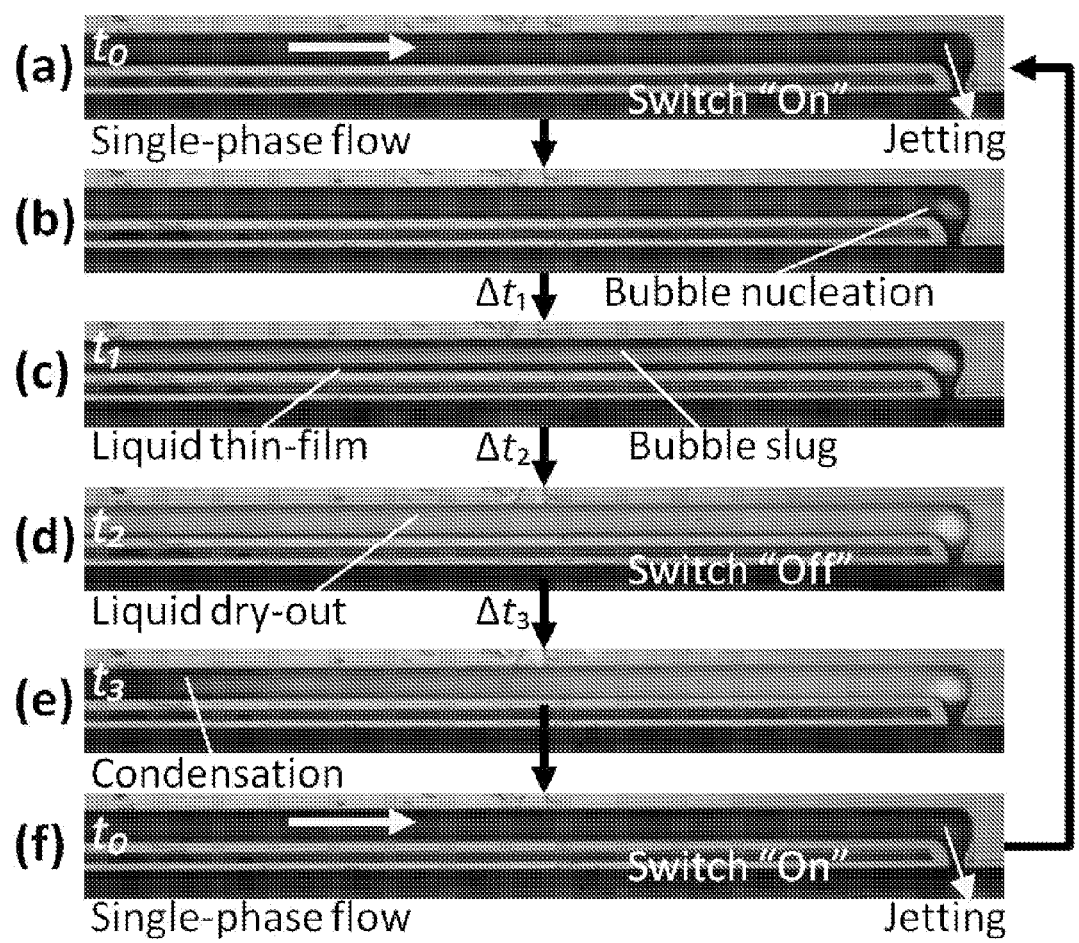
FIG. 14(a)-14(f) shows a visualization of a bubble growing/collapsing cycle in an auxiliary channel at a volumetric flow rate of 11.2 μL/s and an effective heat flux of 111.7 W cm⁻² (for one micro fluidic transistor), with white and dark areas indicate vapor and liquid phase, and with FIG. 14(a) showing single phase liquid flows in the auxiliary channel.

In principal, the function of a unit cross-junction is the same as an electrical transistor during high frequency bubble growth and collapse (HF-BGC) cycles and termed a "microfluidic transistor" in this work. A transistor has three terminals: "Gate", "Source" and "Drain". The electronic carriers flow through the semiconductor channel from "Source" to "Drain", which was modulated by the current through "Gate". Similarly, microbubble growth (FIGS. 14b to 14d) and collapse (FIGS. 14e and 14f) cycles served as switches in auxiliary channels in the experimental study. As shown in FIG. 14, HF-BGC cycles occurred in auxiliary channels and resulted in a HF switch between "on" (FIGS. 14a and 14f) and "off" states (FIG. 14d). Since bubbles in auxiliary channels were restricted by the converging-nozzles, they only expanded back towards the inlet where the bubbles contacted subcooled liquid and cause direct condensation, which led to rapid bubble collapse (FIG. 14e) in the auxiliary channels. The pressure gradient established by the rapid bubble collapse in the auxiliary channels, in return, pumped subcooled fluid to the main channels through the "Gate" (FIG. 14f) via the nozzles. Introducing subcooled fluid into the larger confined bubble trapped in the main channel resulted in direct condensation, and hence, a rapid and complete bubble collapse, which abruptly reduced the flow resistance and amplified the flow rate through the main-channel (from "Source" to "Drain") as detailed in FIG. 15.

A typical HF-BGC cycle in the main channel modulated by a microfluidic transistor is illustrated in FIG. 15. The subcooled fluid pumped from upper auxiliary channel starts to condense the confined bubble in the main channel through the "Gate" as shown in FIG. 15 (at 0 ms). Unlike the auxiliary channels, a confined bubble only expands downstream in the main channels because of inlet restrictors. Once the liquid in the upper auxiliary channel has drained, that auxiliary channel was blocked by a confined bubble and remained in an "off" state, as shown in FIG. 15 (at 3.2 ms) until the bubble collapsed. Moreover, a confined bubble in the lower auxiliary channel collapsed due to direct condensation and was in an "on" state (at 4.6 ms) as shown in FIG. 15, where the confined bubble in the main channel started to deform and shrink (at 4.6 ms). Then, the additional fluid pulse induced by the upper auxiliary channel (at 5.6 ms) eventually led to a complete collapse of the confined bubble in the main channel near the "gate" area within 1 ms, illustrating the microfluidic transistor modulation control. The function of a microfluidic transistor was experimentally demonstrated through a whole BGC cycle in the main channel.

A transient flow resistance model during a TPO cycle in a microchannel was developed in this study to capture the primary features of microbubble-switched oscillations as illustrated in FIGS. 14 and 15. Flow resistance, R, is defined as pressure drop per volume flow rate (Pa S m$^{-3}$). Rather than focusing on understanding bubble dynamics at a component level, this modeling is aimed to outline the mechanism of the HF-TPOs at a system level. Since Reynolds number, Re, is less than 2300 in this study, the Hagen-Poiseuille law was employed to estimate the single-phase flow resistance, denoted as, $R_{1h}$, for an "on" state as shown in FIG. 14a. Choi et al's modified model was adopted in this study to estimate the additional hydraulic resistance resulting from confined bubbles, $R_{2h}$. This state is a short intermediate state between "off" and "on" states as shown in FIG. 14c. Then the thin liquid film between the confined bubble and solid wall was assumed to keep evaporating until the confined bubble eventually attaches to solid wall (i.e., drying out) as shown in FIG. 14d. Thus the surface tension forces induced on both ends of the bubble result in additional flow resistance, $R_{3h}$, which could turn "off" the channel until the confined bubbles collapse.

$$R(t) = \begin{cases} R_{1h}, t = t_0 \\ R_{1h} + R_{2h}(t), t_0 \leq t \leq t_1 \\ R_{1h} + R_{3h}(t), t_1 \leq t \leq t_2 \\ R_{1h} + R_{3h}(t_2), t_2 \leq t < t_3 \end{cases} \quad (1)$$

Figure 16:
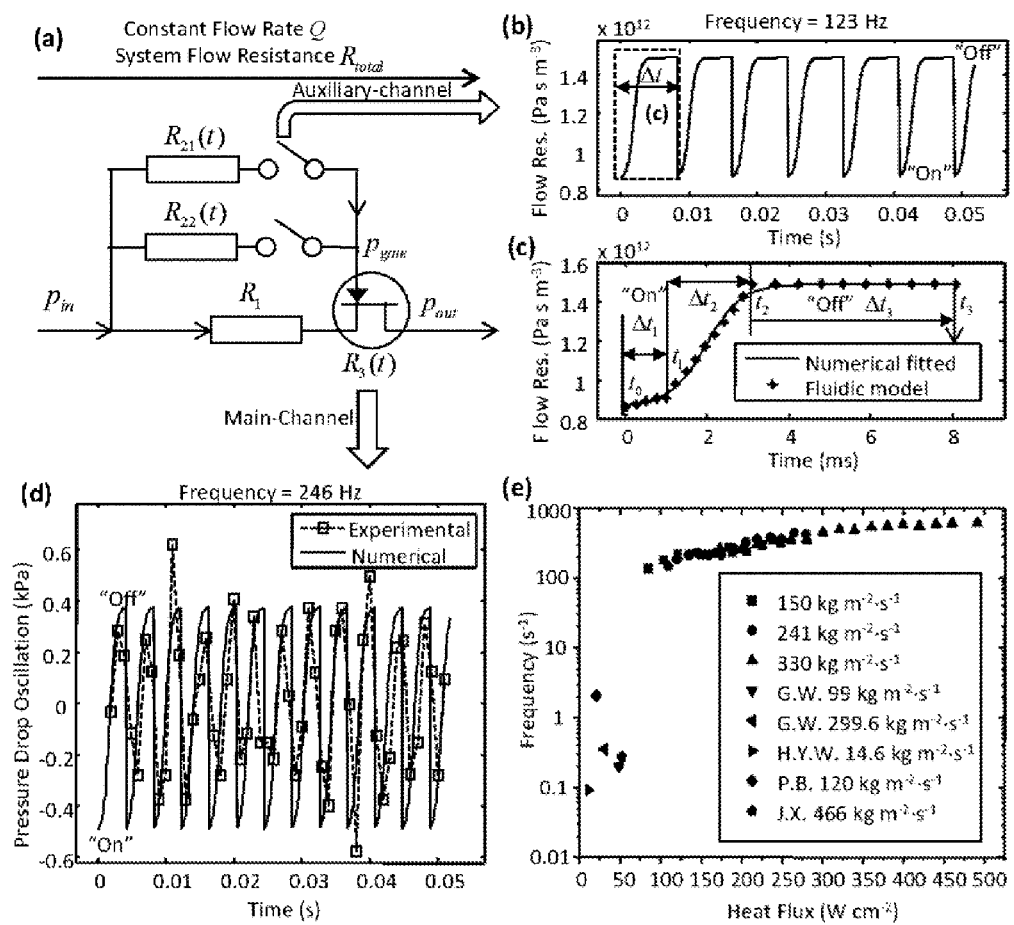
Figure 17:
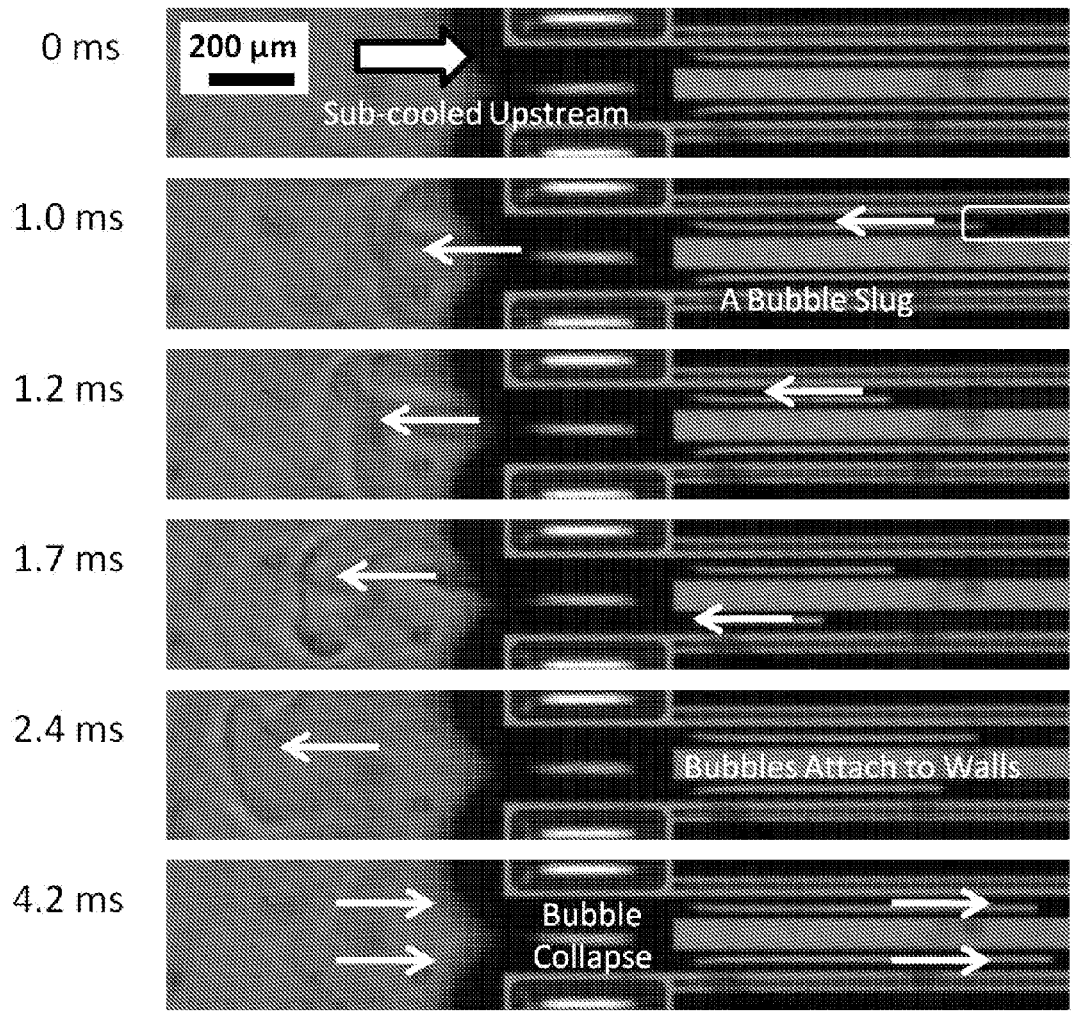
FIG. 17 shows the mechanism of bubble growth, attachment to walls, and collapse in side-channels, with arrows showing the local flow directions, the white rectangle highlighting a confined bubble that is dark black shadow in a side channel under optical microscope. From 0 ms to 1.7 ms, two confined bubbles rapidly grow in side-channels and induce reversal flows into sub-cooled upstream. The direct contact between the sub-cooled water and bubbles results in condensation and hence the collapse of the confined bubbles at 4.2 ms. The additional pressure drop established by collapsed bubbles accelerates the sub-cooled liquid, which is pumped into the main-channel through the cross-junction.

R(t) is a non-linear transient flow resistance during a period of BGC as plotted in FIGS. 16b and 16c. See FIG. 16e for the descriptions of the cycle time periods. A numerically fitted function $R(t)=R_{1h}+R_{3h}(t_2)/(1+ae^{-bt})$ was used to estimate the transient flow resistance of microbubble-switched oscillations using the least square curve fitting method to estimate coefficients a and b from regression analysis of flow resistances (see supplementary materials). This system-level lumped model was sketched in FIG. 16a. The flow resistance from a restrictor (refer to the detailed structure in FIG. 13b), $R_1$, which was designed to prevent the reverse flow in main-channels, was assumed to be a constant during the HF oscillations due to the high-aspect-ratio geometry of the restrictor. As shown in FIG. 16a, each switch unit was expressed by the non-linear function R(t) with corresponding coefficients during HF-BGC cycles. Because of the rapid bubble collapse in the main-channel, flow resistance $R_3(t)$ from "Source" to "Drain" was reduced in a short time, which can be estimated by Bernoulli's equation, $p_{gate}-p_{bubble}=\rho(v_j^2-v_s^2)/2$, where, $\rho$ is the liquid density, $v_j$ is the jetting fluid velocity, and $v_s$ is bulk fluid velocity in auxiliary channels. To simplify the HF-TPO model during a typical BGC cycle, the time for the ultrafast bubble collapse cycle was neglected due to its much shorter duration (e.g., less than 0.2 ms) compared to the total cycle duration, approximately, 5 ms, according to experimental data. As a reference pressure, outlet pressure is assumed to be the constant environment pressure. High frequency low amplitude TPOs caused very small measured fluctuations (<2%) in inlet pressure. Numerical simulation and experimental data of system pressure drop are compared and plotted in FIG. 16d.

The test results were summarized and also compared with reported data from other researchers on flow oscillations in confined micro-domains. The frequency of BGC cycles in the auxiliary channels were predicted by the model to be approximately 123 Hz at a heat flux of 125 W/cm$^2$ and mass flux of 258 kg/m$^2$·s, which is approximately three orders of magnitude higher than TPO frequencies reported for micro devices. An interesting phenomenon observed was that the switching motions from two auxiliary channels were alternating, which further improved the frequency of the bubble-switched oscillations in the main channel because of superimposition effects. The overall TPO frequency in the main channel was approximately 246 Hz according to numerical simulations, which is approximately doubled and agrees well with the experimental measurement of 240 Hz (FIG. 16d). Great agreement implies that the major characteristics of the proposed HF-TPOs and microfluidic transistors were captured well.

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in whole or in part. Furthermore, those of ordinary skill in the art will appreciate that the foregoing description is by way of example only, and is not intended to limit the invention so further described in the appended claims.

What is claimed:

1. A microfluidic device, comprising:
  a substrate having a surface, wherein a main channel and a first auxiliary channel are defined in the surface, the main channel having a main width of about 1000µm or less, wherein the first auxiliary channel intersects with the main channel at a first aperture defined in a first side wall of the main channel to define a first intersection, and wherein the first auxiliary channel terminates at the first intersection, and further wherein the first auxiliary channel is tapered at the first intersection, and
  wherein a second auxiliary channel is defined in the surface, and wherein the second auxiliary channel intersects with the main channel at a second intersection, wherein the second auxiliary channel terminates at the second intersection.

2. The microfluidic device as in claim 1, wherein the main channel is substantially parallel to the first auxiliary channel.

3. The microfluidic device as in claim 1, wherein a thermal isolation gap is positioned between the main channel and the first auxiliary channel.

4. The microfluidic device as in claim 1, wherein the first auxiliary channel defines a first auxiliary width across a middle section of the first auxiliary channel and the first aperture has a first aperture width in the side wall of the main channel, and wherein the first aperture width is about 15% to about 85% of the first auxiliary width.

5. The microfluidic device as in claim 1, wherein the first auxiliary channel defines a first auxiliary width across a middle section of the first auxiliary channel and the first aperture has a first aperture width in the side wall of the main channel, and wherein the first aperture width is about 25% to about 80% of the first auxiliary width.

6. The microfluidic device as in claim 1, wherein the first auxiliary channel defines a first auxiliary width across a middle section of the first auxiliary channel, and wherein the first auxiliary width is about 5% to about 50% of the main width.

7. The microfluidic device as in claim 1, wherein the first auxiliary channel defines a first auxiliary width across a middle section of the first auxiliary channel, and wherein the first auxiliary width is about 10% to about 40% of the main width.

8. The microfluidic device as in claim 1, wherein the main channel defines a main inlet defining a main inlet width, and wherein the main inlet width is about 5% to about 75% of the main width.

9. The microfluidic device as in claim 8, wherein the surface further defines an inlet port and a plurality of flow stabilizers, the plurality of flow stablizers positioned between the inlet port and the main inlet.

10. The microfluidic device as in claim 1, wherein the main channel is substantially parallel to the second auxiliary channel.

11. The microfluidic device as in claim 1, wherein the second auxiliary channel is tapered at the second intersection.

12. The microfluidic device as in claim 11, wherein the second auxiliary channel defines a second auxiliary width across a middle section of the second auxiliary channel and a second intersection width at the second intersection, and wherein the second intersection width is about 15% to about 85% of the second auxiliary width.

13. The microfluidic device as in claim 11, wherein the second auxiliary channel defines a second auxiliary width across a middle section of the second auxiliary channel, and wherein the second auxiliary width is about 5% to about 50% of the main width.

14. The microfluidic device as in claim 1, wherein the first intersection and the second intersection are oriented substantially across from each other on the main channel.

15. The microfluidic device as in claim 1, wherein the main channel has a depth of about 100 µm to about 1000 µm.

16. The microfluidic device as in claim 1, wherein the first auxiliary channel intersects with the main channel at the first intersection at an angle of about 75° to about 105°.

17. The microfluidic device as in claim 1, further comprising:
a glass wafer positioned on the surface of the substrate.

18. A microfluidic device, comprising:
a substrate having a surface, wherein the surface defines a plurality of main channels and a plurality of auxiliary channels, with at least two auxiliary channels intersecting with each main channel at a tapered intersection on a terminal end of the auxiliary channel, each main channel having a main width of about 1000 µm or less.

* * * * *